(12) United States Patent
Karr et al.

(10) Patent No.: US 11,593,036 B2
(45) Date of Patent: Feb. 28, 2023

(54) STAGING DATA WITHIN A UNIFIED STORAGE ELEMENT

(71) Applicant: Pure Storage, Inc., Mountain View, CA (US)

(72) Inventors: Ronald Karr, Palo Alto, CA (US); Constantine Sapuntzakis, Mountain View, CA (US); John Colgrove, Los Altos, CA (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/966,024

(22) Filed: Apr. 30, 2018

(65) Prior Publication Data
US 2018/0357018 A1   Dec. 13, 2018

Related U.S. Application Data

(63) Continuation of application No. 15/697,521, filed on Sep. 7, 2017, which is a continuation of application
(Continued)

(51) Int. Cl.
*G06F 3/06* (2006.01)
*G06F 11/14* (2006.01)
(Continued)

(52) U.S. Cl.
CPC ............ *G06F 3/0685* (2013.01); *G06F 3/061* (2013.01); *G06F 3/067* (2013.01); *G06F 3/0616* (2013.01);
(Continued)

(58) Field of Classification Search
CPC ...... G06F 3/0685; G06F 3/061; G06F 3/0616; G06F 3/0617; G06F 3/0647;
(Continued)

(56) References Cited

U.S. PATENT DOCUMENTS

| 5,603,001 A | 2/1997 | Sukegawa et al. |
| 5,651,133 A | 7/1997 | Burkes et al. |

(Continued)

FOREIGN PATENT DOCUMENTS

| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Eric Cardwell

(57) ABSTRACT

Staging data on a storage element integrating fast durable storage and bulk durable storage, including: receiving, at a storage element integrating fast durable storage and bulk durable storage, a data storage operation from a host computer; storing data corresponding to the data storage operation within fast durable storage in accordance with a first data resiliency technique; and responsive to detecting a condition for transferring data between fast durable storage and bulk durable storage, transferring the data from fast durable storage to bulk durable storage in accordance with a second data resiliency technique.

16 Claims, 17 Drawing Sheets

Related U.S. Application Data

No. 15/697,566, filed on Sep. 7, 2017, which is a continuation of application No. 15/697,540, filed on Sep. 7, 2017.

(60) Provisional application No. 62/631,933, filed on Feb. 18, 2018, provisional application No. 62/589,524, filed on Nov. 21, 2017, provisional application No. 62/518,551, filed on Jun. 12, 2017.

(51) Int. Cl.
*G06F 11/20* (2006.01)
*G06F 11/10* (2006.01)
*G06F 11/30* (2006.01)
*G06F 11/07* (2006.01)
*G06F 11/16* (2006.01)

(52) U.S. Cl.
CPC .......... *G06F 3/0617* (2013.01); *G06F 3/0647* (2013.01); *G06F 3/0659* (2013.01); *G06F 11/0727* (2013.01); *G06F 11/0793* (2013.01); *G06F 11/1076* (2013.01); *G06F 11/1435* (2013.01); *G06F 11/1662* (2013.01); *G06F 11/2005* (2013.01); *G06F 11/2007* (2013.01); *G06F 11/2089* (2013.01); *G06F 11/2094* (2013.01); *G06F 11/3034* (2013.01); *G06F 11/3055* (2013.01); *G06F 11/1441* (2013.01); *G06F 11/2071* (2013.01); *G06F 2201/84* (2013.01); *G06F 2212/261* (2013.01)

(58) Field of Classification Search
CPC .... G06F 3/0659; G06F 3/067; G06F 11/1435; G06F 2212/261
See application file for complete search history.

(56) References Cited

U.S. PATENT DOCUMENTS

| | | | |
|---|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,101,615 A | 8/2000 | Lyons |
| 6,643,641 B1 | 11/2003 | Snyder |
| 6,647,514 B1 | 11/2003 | Umberger et al. |
| 6,675,255 B1 | 1/2004 | Roohparvar |
| 6,718,435 B2 | 4/2004 | Riedle |
| 6,789,162 B1 | 9/2004 | Talagala et al. |
| 6,799,284 B1 | 9/2004 | Patel et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,206,991 B2 | 4/2007 | Chatterjee et al. |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 7,984,325 B2 | 7/2011 | Fukutomi et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,527,698 B2 | 9/2013 | Bert |
| 8,560,772 B1 | 10/2013 | Piszczek et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,862,818 B1 | 10/2014 | Ozdemir |
| 8,898,346 B1 | 11/2014 | Simmons |
| 8,909,854 B2 | 12/2014 | Yamagishi et al. |
| 8,931,041 B1 | 1/2015 | Banerjee |
| 8,949,692 B1 | 2/2015 | Bonwick |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,063,854 B1 | 6/2015 | Subramanian et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,383,940 B1 * | 7/2016 | Ives ..................... G06F 3/0617 |
| 9,444,822 B1 | 9/2016 | Borowiec et al. |
| 9,507,532 B1 | 11/2016 | Colgrove et al. |
| 9,612,745 B2 | 4/2017 | Fenske |
| 9,632,870 B2 | 4/2017 | Bennett |
| 10,417,092 B2 | 9/2019 | Brennan et al. |
| 10,552,090 B2 | 2/2020 | Karr et al. |
| 10,789,020 B2 | 9/2020 | Karr et al. |
| 2002/0013802 A1 | 1/2002 | Mori et al. |
| 2002/0129195 A1 | 9/2002 | Hongo et al. |
| 2002/0184239 A1 | 12/2002 | Mosher et al. |
| 2003/0033477 A1 | 2/2003 | Johnson et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0087940 A1 | 4/2006 | Brewer et al. |
| 2006/0129817 A1 | 6/2006 | Borneman et al. |
| 2006/0161726 A1 | 7/2006 | Lasser |
| 2006/0206662 A1 | 9/2006 | Ludwig et al. |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0147963 A1 | 6/2008 | Tsai et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0172277 A1 | 7/2009 | Chen |
| 2009/0198877 A1 | 8/2009 | Pua et al. |
| 2009/0198889 A1 | 8/2009 | Ito et al. |
| 2009/0271564 A1 | 10/2009 | Sugimoto et al. |
| 2010/0052625 A1 | 3/2010 | Cagno et al. |

(56) References Cited

U.S. PATENT DOCUMENTS

| | | | |
|---|---|---|---|
| 2010/0082879 A1 | 4/2010 | Mckean et al. | |
| 2010/0199036 A1* | 8/2010 | Siewert | G06F 3/0613 |
| | | | 711/112 |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0010485 A1 | 1/2011 | Lin et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0138154 A1* | 6/2011 | Tevis | G06F 3/0632 |
| | | | 712/220 |
| 2011/0157951 A1 | 6/2011 | Hung et al. | |
| 2011/0167221 A1 | 7/2011 | Pangal et al. | |
| 2011/0252186 A1 | 10/2011 | Dinker | |
| 2011/0307642 A1* | 12/2011 | Yamasaki | G06F 21/445 |
| | | | 710/313 |
| 2011/0307652 A1 | 12/2011 | Cho | |
| 2011/0314218 A1 | 12/2011 | Bert | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0191903 A1 | 7/2012 | Araki et al. | |
| 2012/0239856 A1 | 9/2012 | Cho | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198437 A1* | 8/2013 | Omizo | G06F 12/0246 |
| | | | 711/103 |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0290777 A1 | 10/2013 | Yoshihara | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0212736 A1 | 7/2015 | Fenske | |
| 2015/0234595 A1 | 8/2015 | Satou | |
| 2015/0242139 A1 | 8/2015 | Moore et al. | |
| 2015/0378888 A1 | 12/2015 | Zhang et al. | |
| 2016/0080490 A1* | 3/2016 | Verma | H04L 67/1097 |
| | | | 709/217 |
| 2016/0098323 A1 | 4/2016 | Mutha et al. | |
| 2016/0124812 A1 | 5/2016 | Sarkar et al. | |
| 2016/0018841 A1 | 6/2016 | Lee | |
| 2016/0179422 A1 | 6/2016 | Lee | |
| 2016/0246518 A1 | 8/2016 | Galbraith et al. | |
| 2016/0246678 A1 | 8/2016 | Galbraith et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0177592 A1* | 6/2017 | Starr | G06F 11/00 |
| 2017/0262202 A1 | 9/2017 | Seo | |
| 2017/0277432 A1 | 9/2017 | Yun et al. | |
| 2018/0232165 A1* | 8/2018 | Kusters | G06F 11/2071 |
| 2018/0357017 A1 | 12/2018 | Karr et al. | |
| 2018/0357019 A1 | 12/2018 | Karr et al. | |
| 2019/0073162 A1 | 3/2019 | Karr et al. | |
| 2019/0073265 A1 | 3/2019 | Brennan et al. | |

FOREIGN PATENT DOCUMENTS

| | | | |
|---|---|---|---|
| WO | WO-2013071087 A1 | 5/2013 | |
| WO | WO-2014/110137 A1 | 7/2014 | |
| WO | WO-2016/015008 A1 | 12/2016 | |
| WO | WO-2016/190938 A1 | 12/2016 | |
| WO | WO-2016/195759 A1 | 12/2016 | |
| WO | WO-2016/195958 A1 | 12/2016 | |
| WO | WO-2016/195961 A1 | 12/2016 | |
| WO | WO 2017/095567 A1 | 6/2017 | |
| WO | 2018231350 A1 | 12/2018 | |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

(56) References Cited

OTHER PUBLICATIONS

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-Mcintyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As The Primary System Interconnect In Multiroot Compute, Storage, Communications And Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

Anvin, *The mathematics of RAID-6*, Linux Kernel Archive (online), accessed Apr. 24, 2018, 9 pages, URL: mirrors.edge.kernel.org/pub/linux/kernel/people/hpa/raid6.pdf.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

Wilkes et al., *The HP AutoRAID Hierarchical Storage System*, ACM Transactions on Computer Systems (TOCS), vol. 14, Issue 1, Feb. 1996, pp. 108-136, <https://people.eecs.berkeley.edu/-brewer/cs262/AutoRAID.pdf>.

International Search Report and Written Opinion, PCT/US2018/030209, dated Jun. 27, 2018, 10 pages.

\* cited by examiner

STAGING DATA WITHIN A UNIFIED STORAGE ELEMENT

CROSS REFERENCE TO RELATED APPLICATIONS

This application is a continuation application of U.S. patent application Ser. Nos. 15/697,540, 15/697,566, and 15/697,521, filed Sep. 7, 2017, and claims benefit of U.S. Provisional Patent Applications: 62/518,551, filed Jun. 12, 2017, 62/589,524, filed Nov. 21, 2017, and 62/631,933, filed Feb. 18, 2018.

Figure 3A:
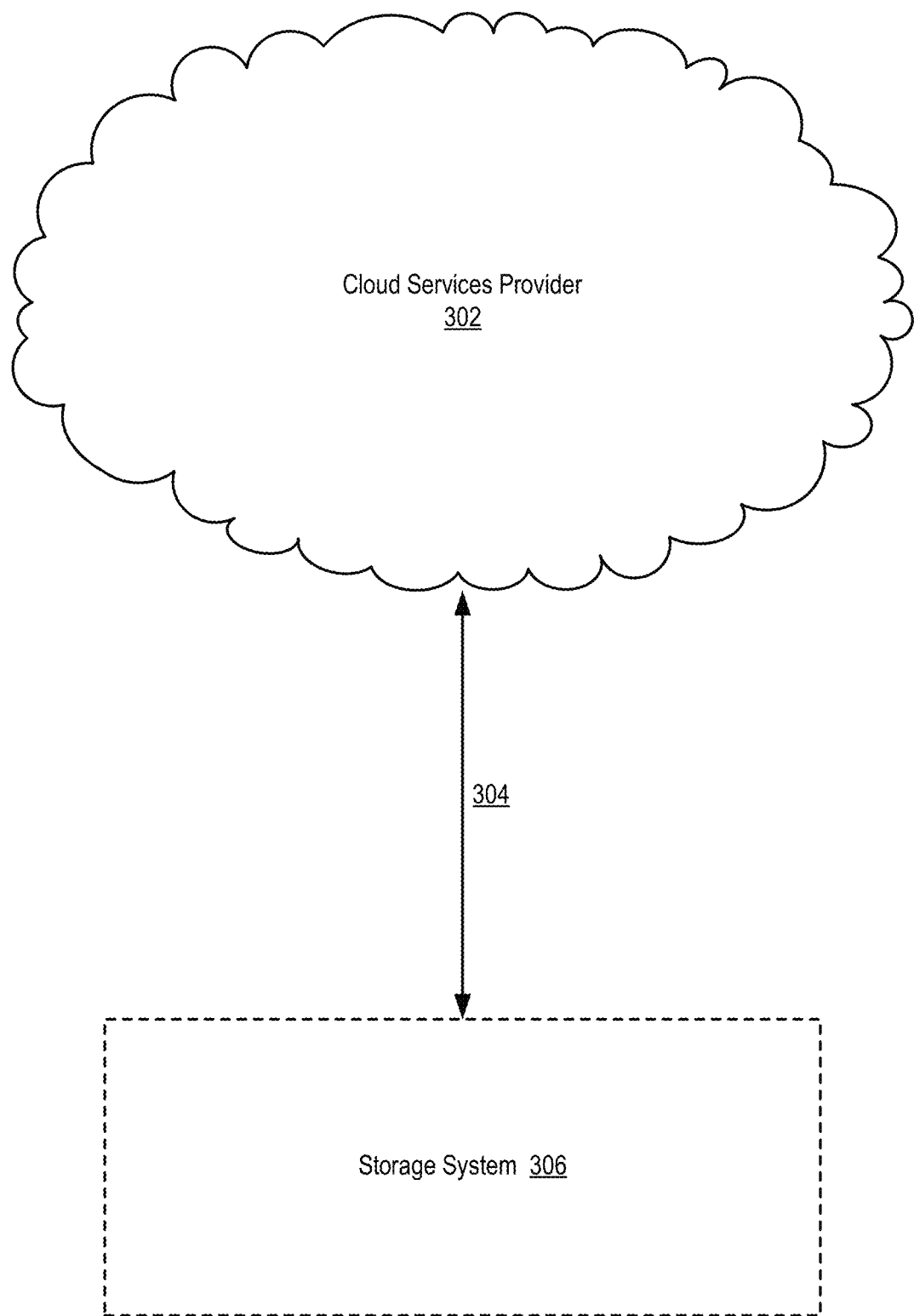

FIG. 3A sets forth a diagram of a storage system that is coupled for data communications with a cloud services provider in accordance with some embodiments of the present disclosure.

Figure 3B:
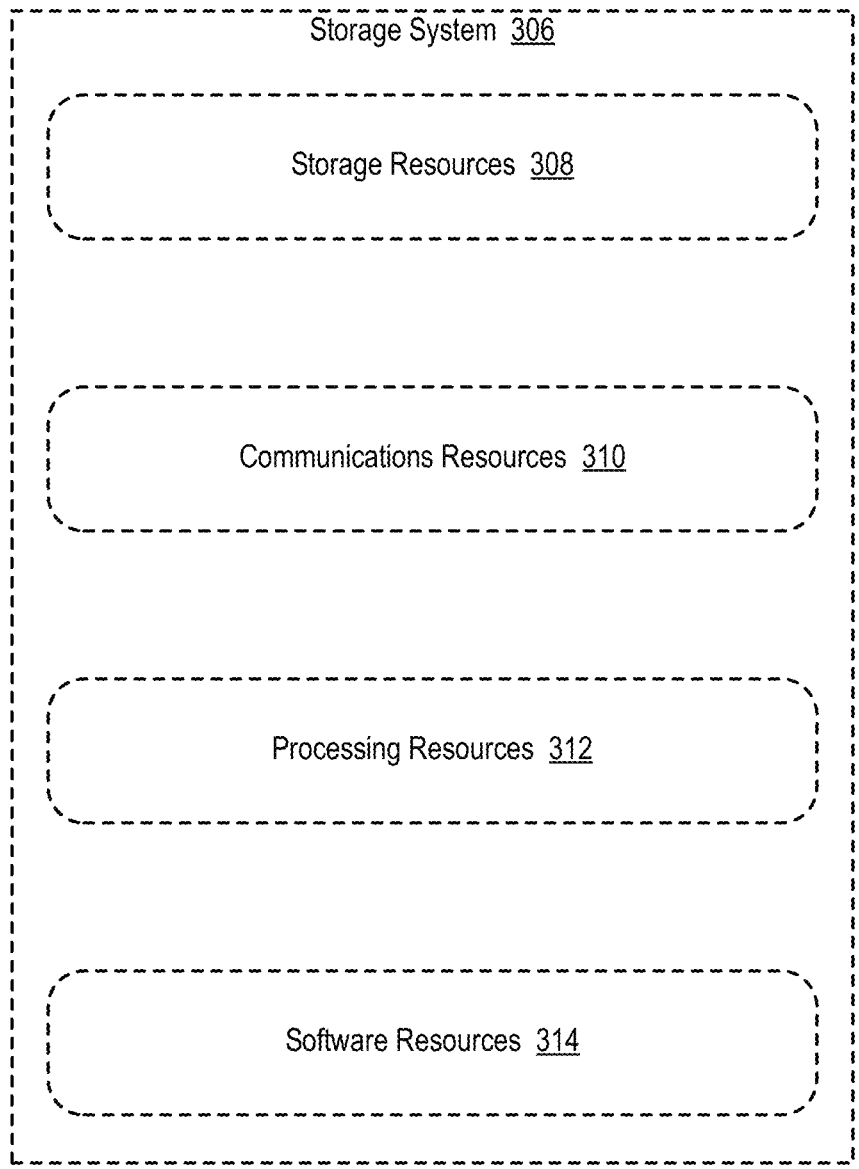

FIG. 3B sets forth a diagram of a storage system in accordance with some embodiments of the present disclosure.

Figure 3C:
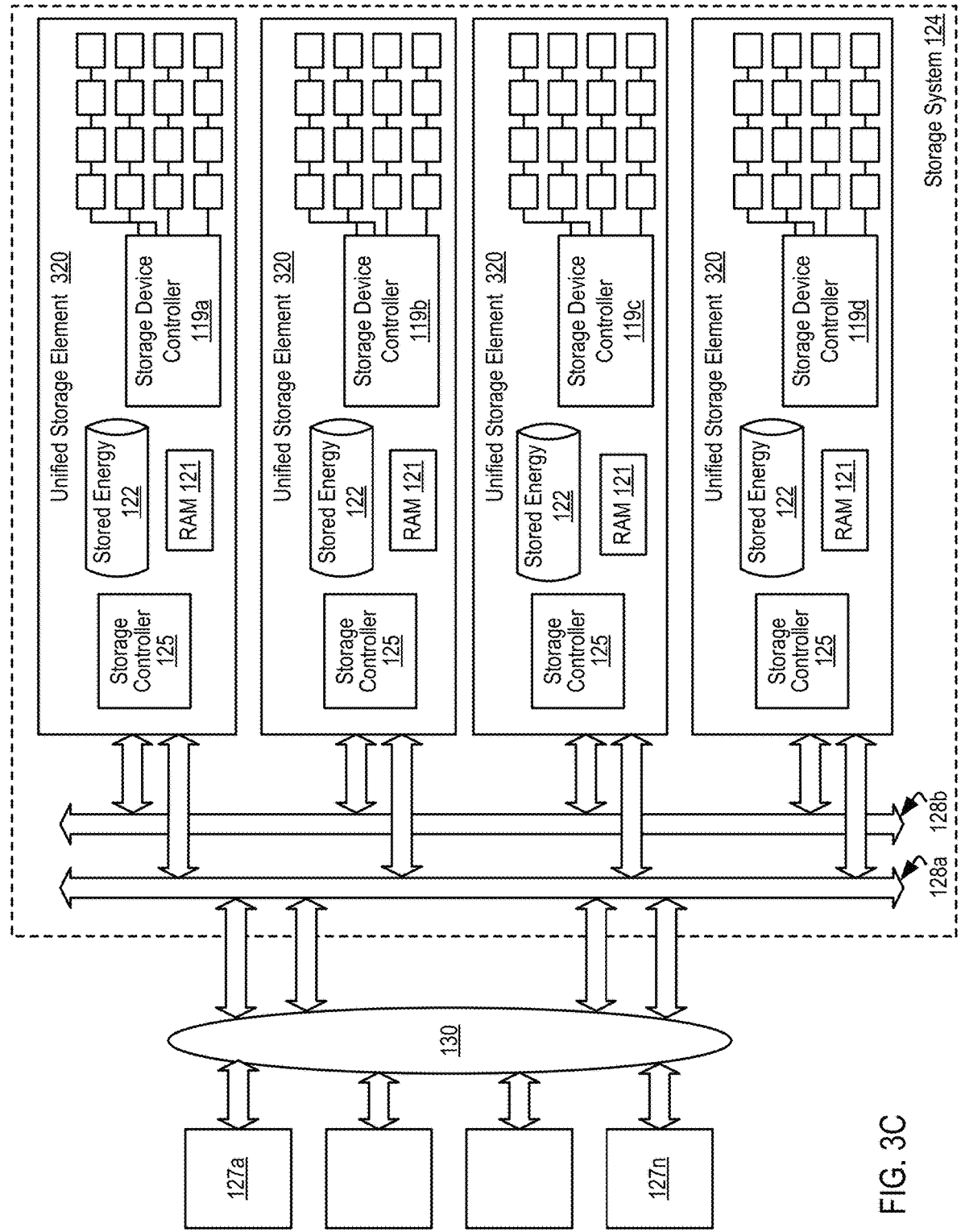

FIG. 3C sets forth a diagram of a storage system in accordance with some embodiments of the present disclosure.

Figure 4:
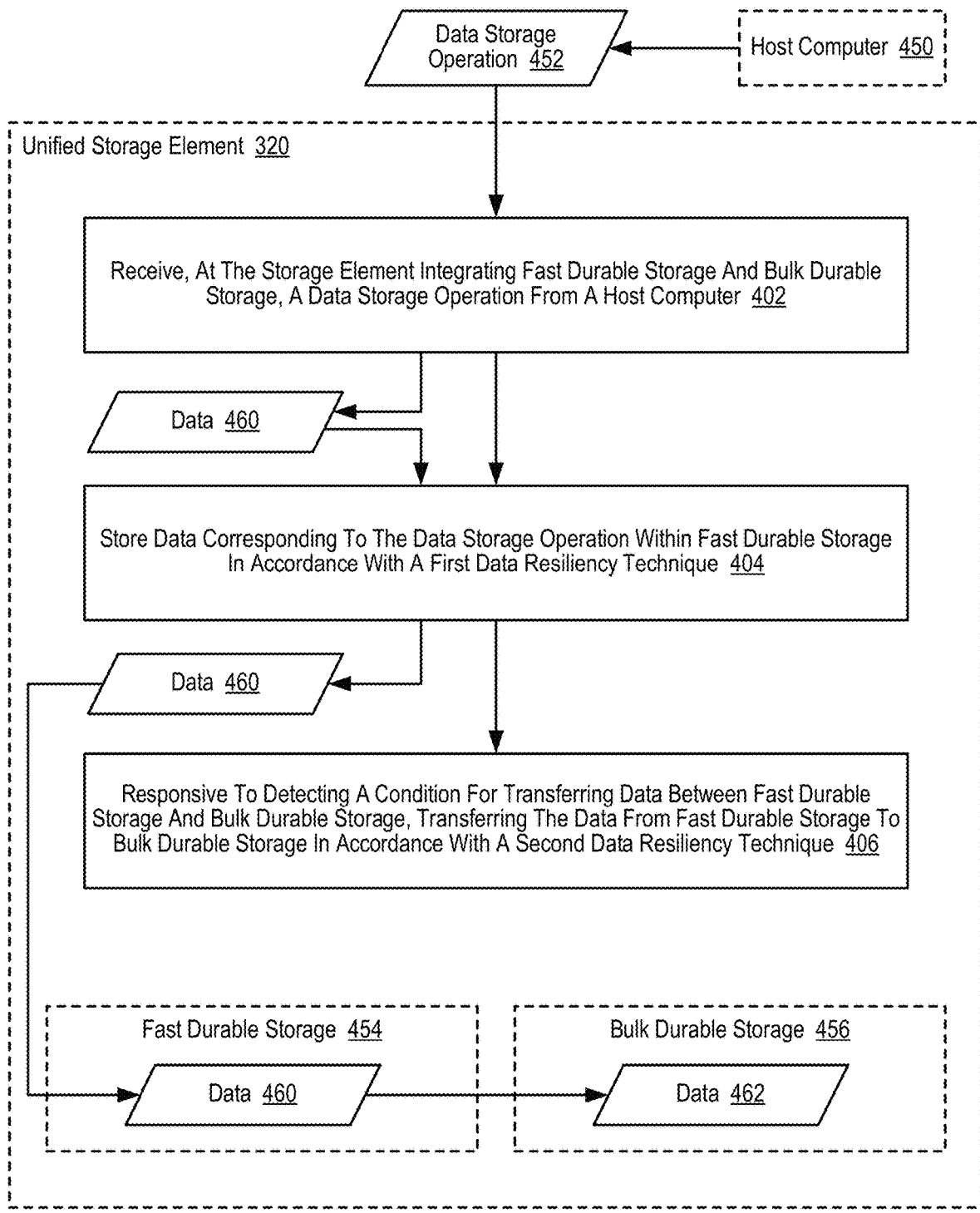

FIG. 4 sets forth a flow chart illustrating an example method for staging data within a unified storage element according to some embodiments of the present disclosure.

Figure 5:
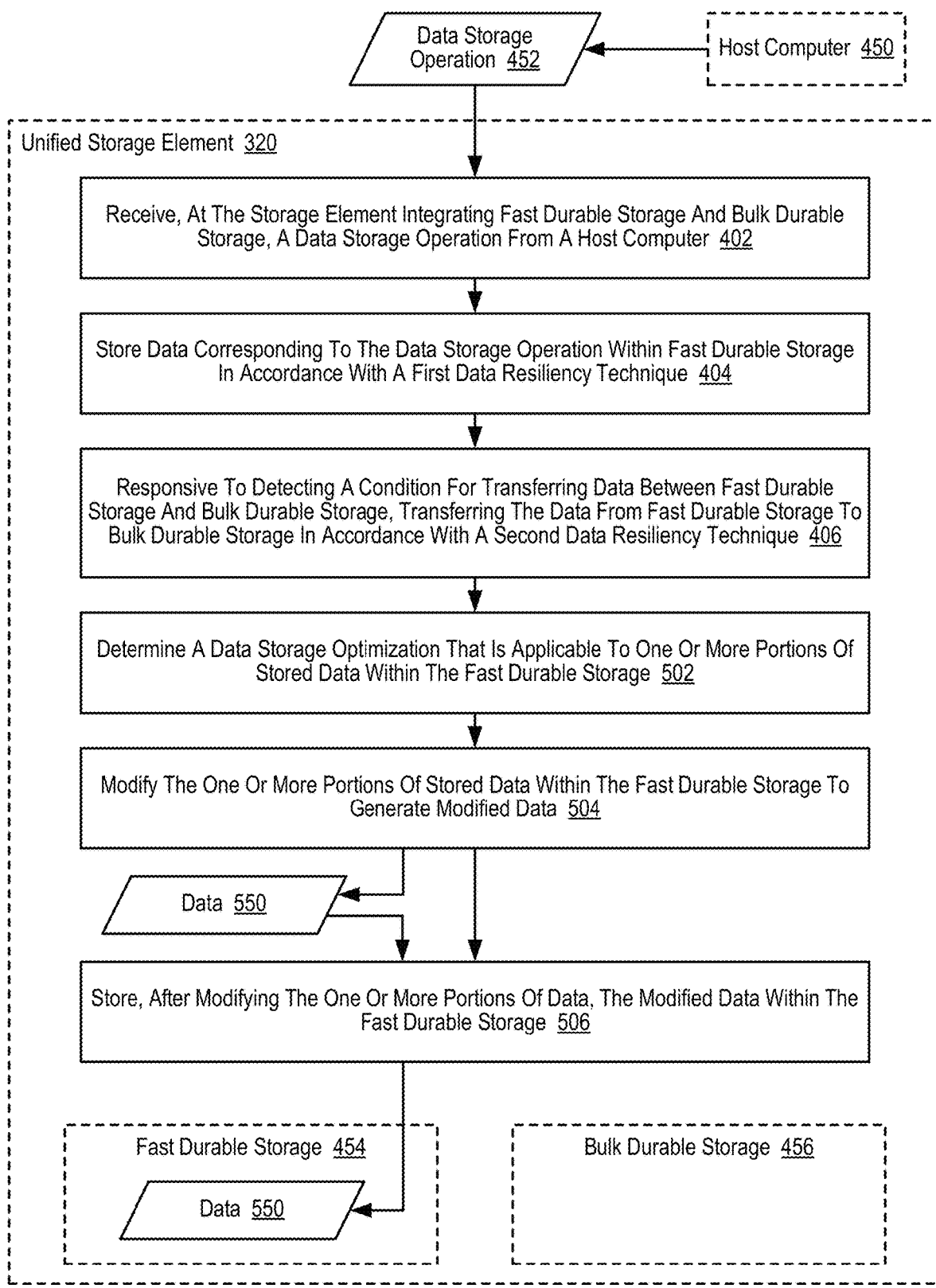

FIG. 5 sets forth a flow chart illustrating an example method for staging data within a unified storage element according to some embodiments of the present disclosure.

Figure 6:
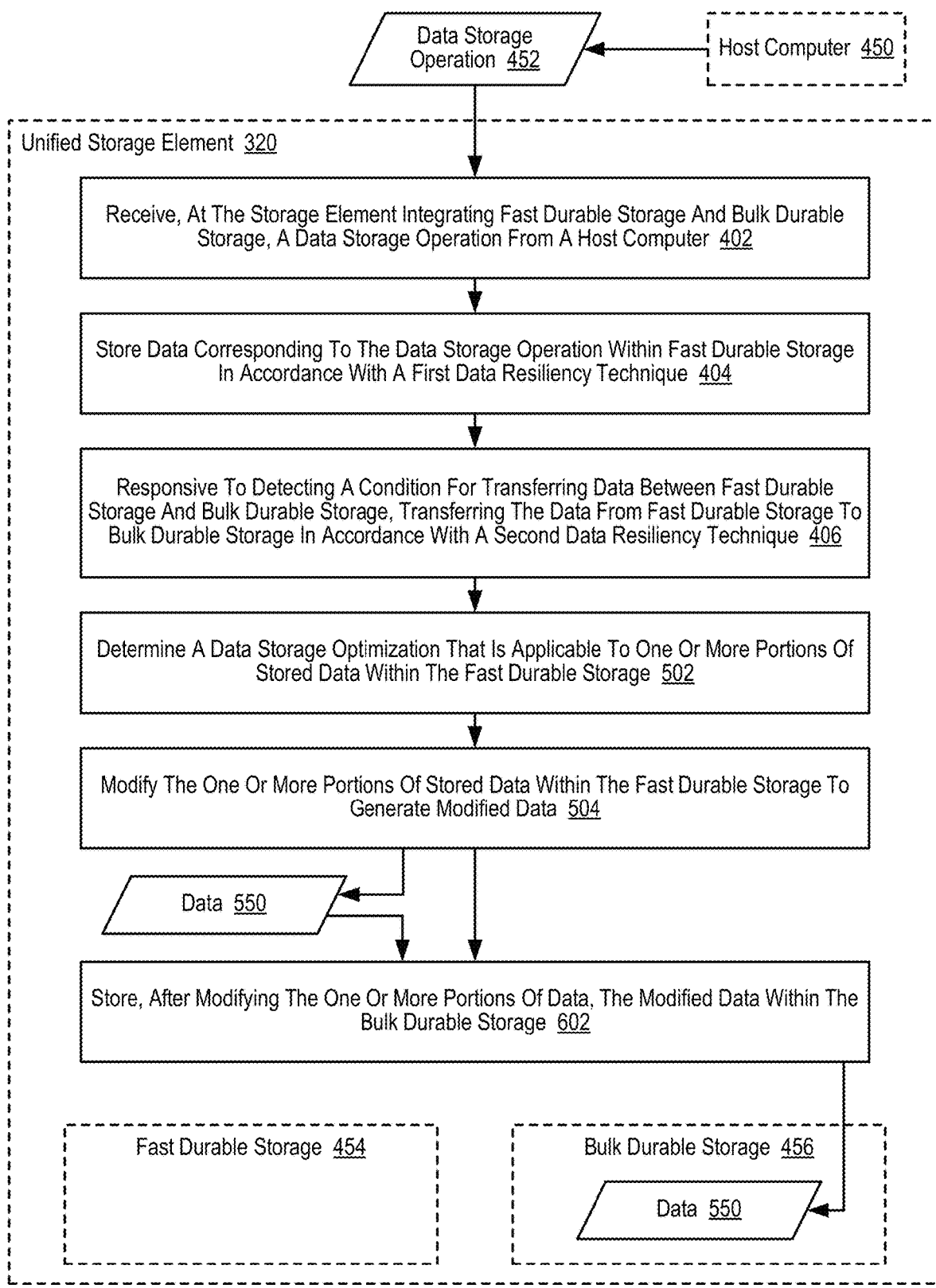

FIG. 6 sets forth a flow chart illustrating an example method for staging data within a unified storage element according to some embodiments of the present disclosure.

Figure 7:
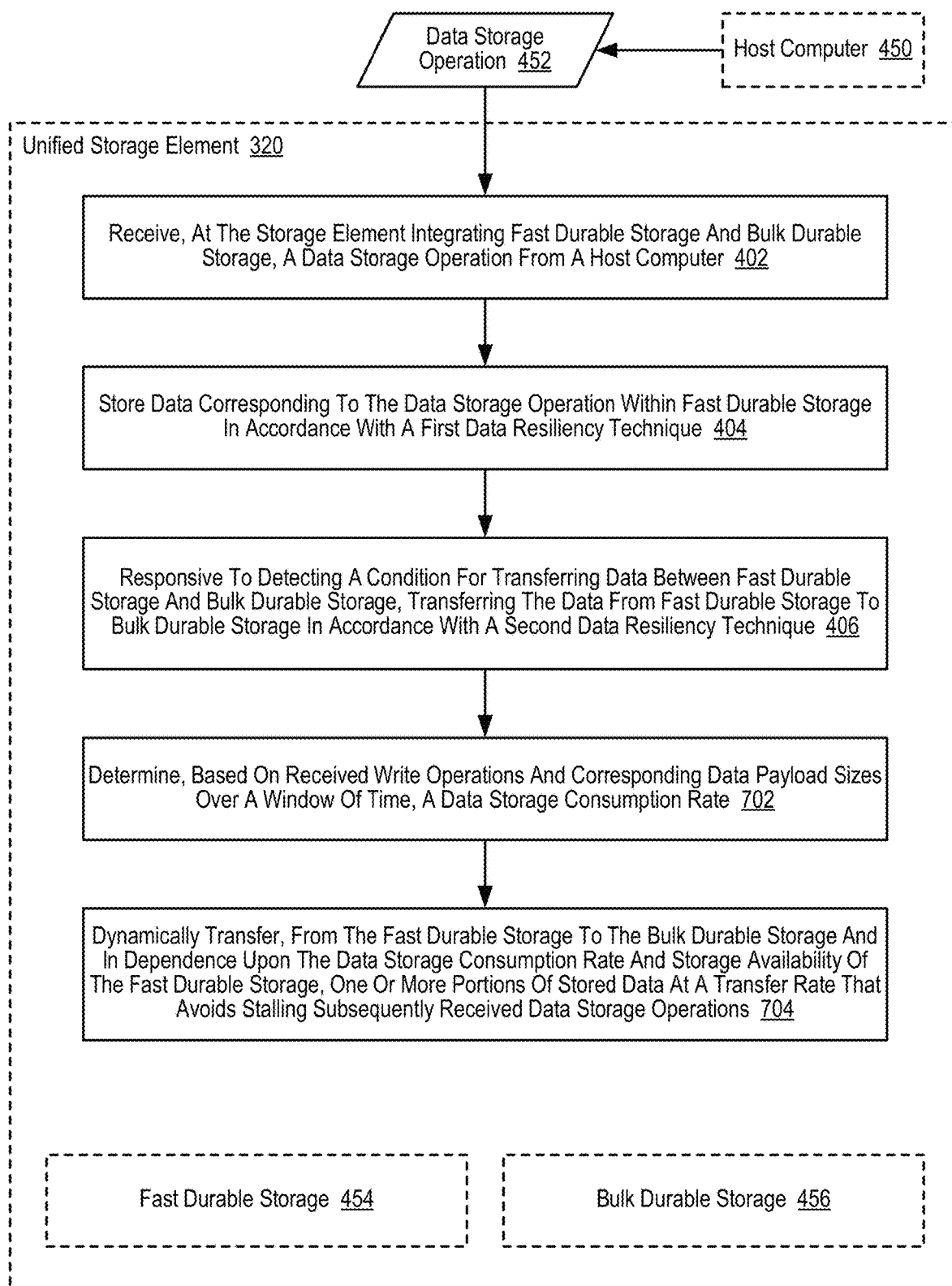

FIG. 7 sets forth a flow chart illustrating an example method for staging data within a unified storage element according to some embodiments of the present disclosure.

DESCRIPTION OF EMBODIMENTS

Figure 1A:
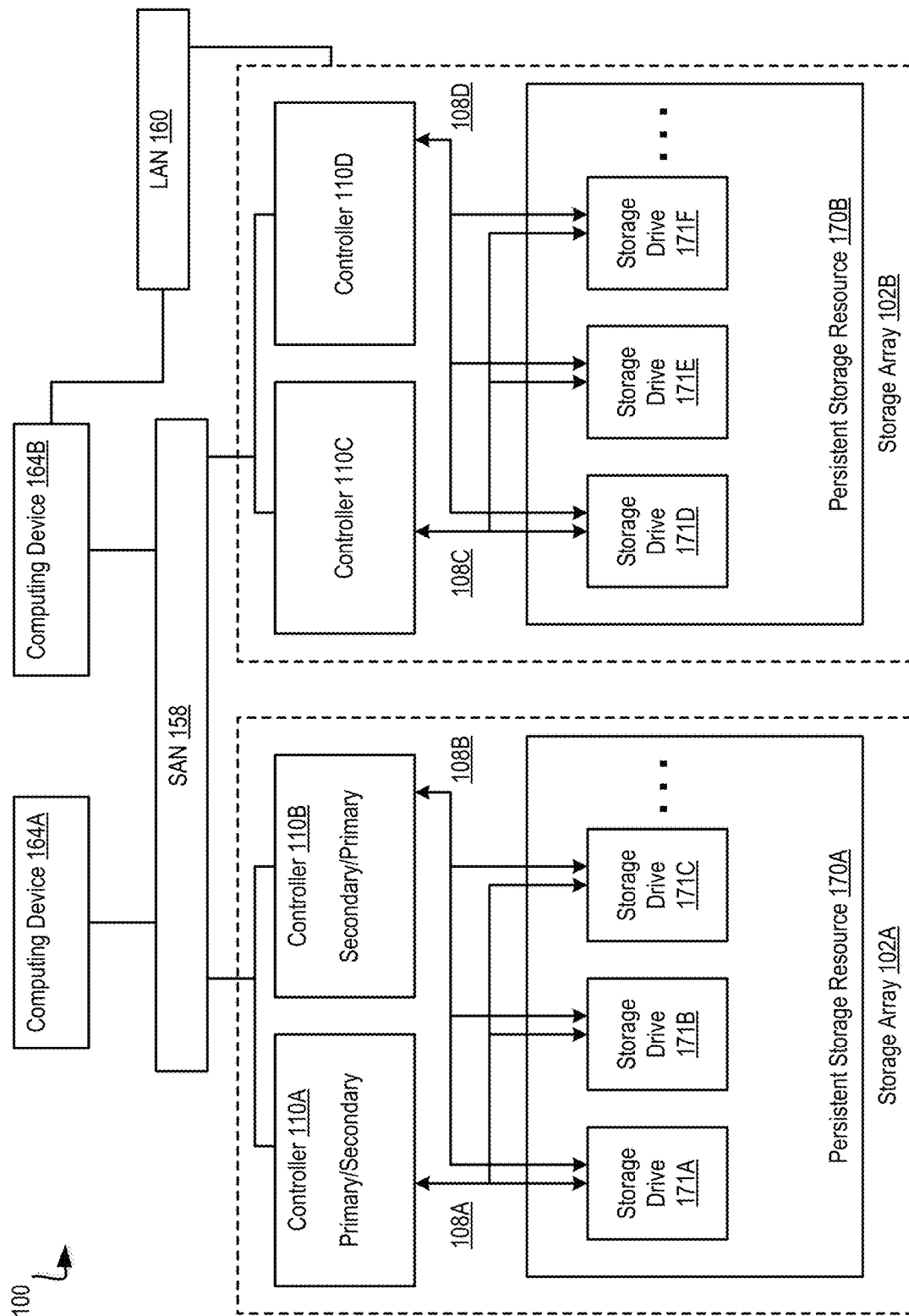
FIG. 1A illustrates a first example system for data storage in accordance with some implementations.

Example methods, apparatus, and products for staging data within a unified storage element in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller (e.g., storage array controller 110A) of a storage system 100 may be designated with primary status (also referred to as "primary controller" herein), and other storage array controllers (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
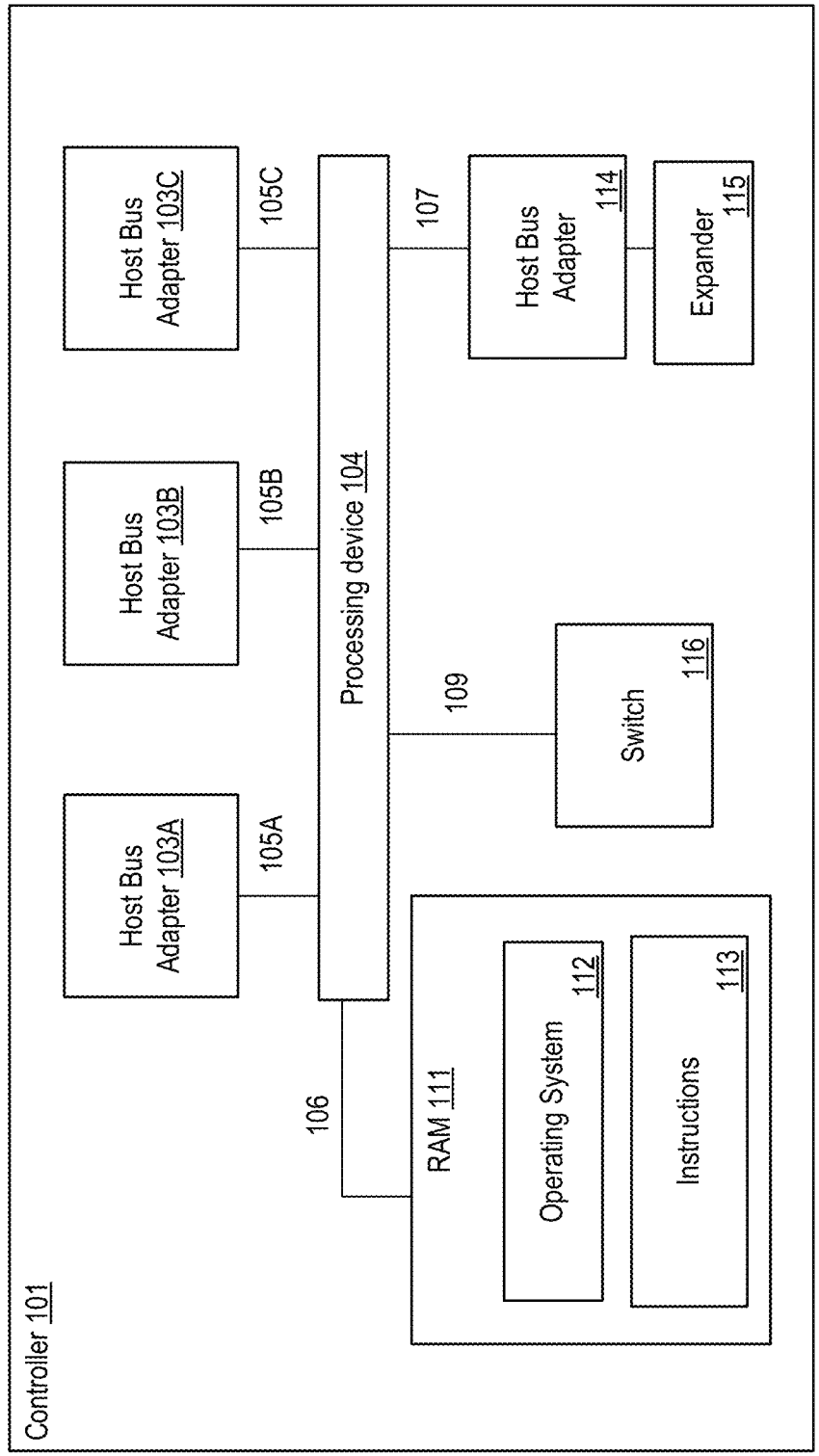
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is in contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
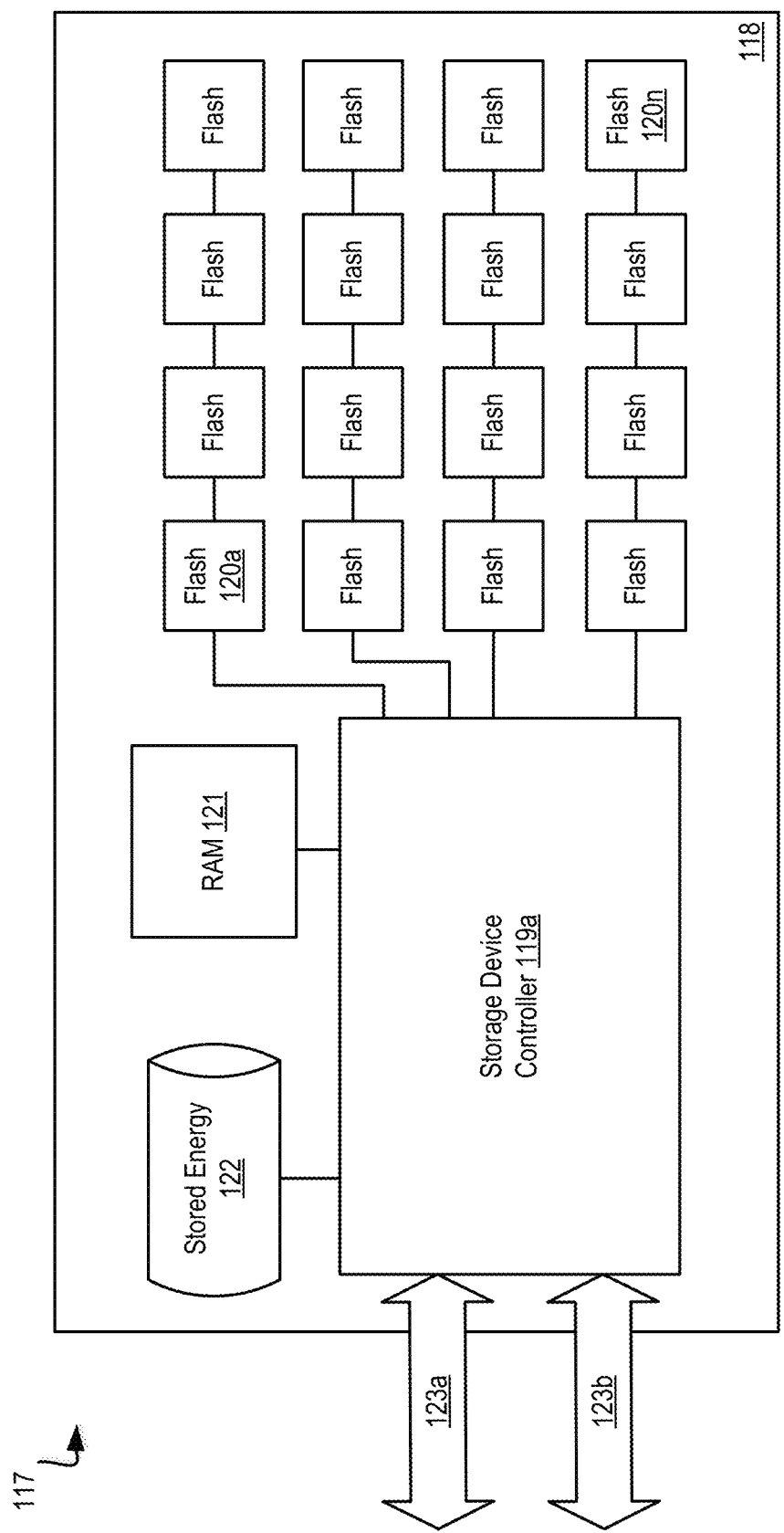
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119a-d. In one embodiment, storage device controller 119a-d may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119a-d. Flash memory devices 120a-n, may be presented to the controller 119a-d as an addressable collection of Flash pages, erase blocks, and/or control elements sufficient to allow the storage device controller 119a-d to program and retrieve various aspects of the Flash. In one embodiment, storage device controller 119a-d may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119a-d or multiple storage device controllers. The RAM 121 may be utilized for other purposes as well, such as temporary program memory for a processing device (e.g., a CPU) in the storage device controller 119a-d.

In one embodiment, system 117 may include a stored energy device 122, such as a rechargeable battery or a capacitor. Stored energy device 122 may store energy sufficient to power the storage device controller 119a-d, some amount of the RAM (e.g., RAM 121), and some amount of Flash memory (e.g., Flash memory 120a-120n) for sufficient time to write the contents of RAM to Flash memory. In one embodiment, storage device controller 119a-d may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119a-d from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119a-d may present a logical device over a PCI bus which may include an addressable fast-write logical device, or a distinct part of the logical address space of the Dual PCI storage device 118, which may be presented as PCI memory or as persistent storage. In one embodiment, operations to store into the device are directed into the RAM 121. On power failure, the storage device controller 119a-d may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a Dual PCI storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119a-d and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119a-d. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
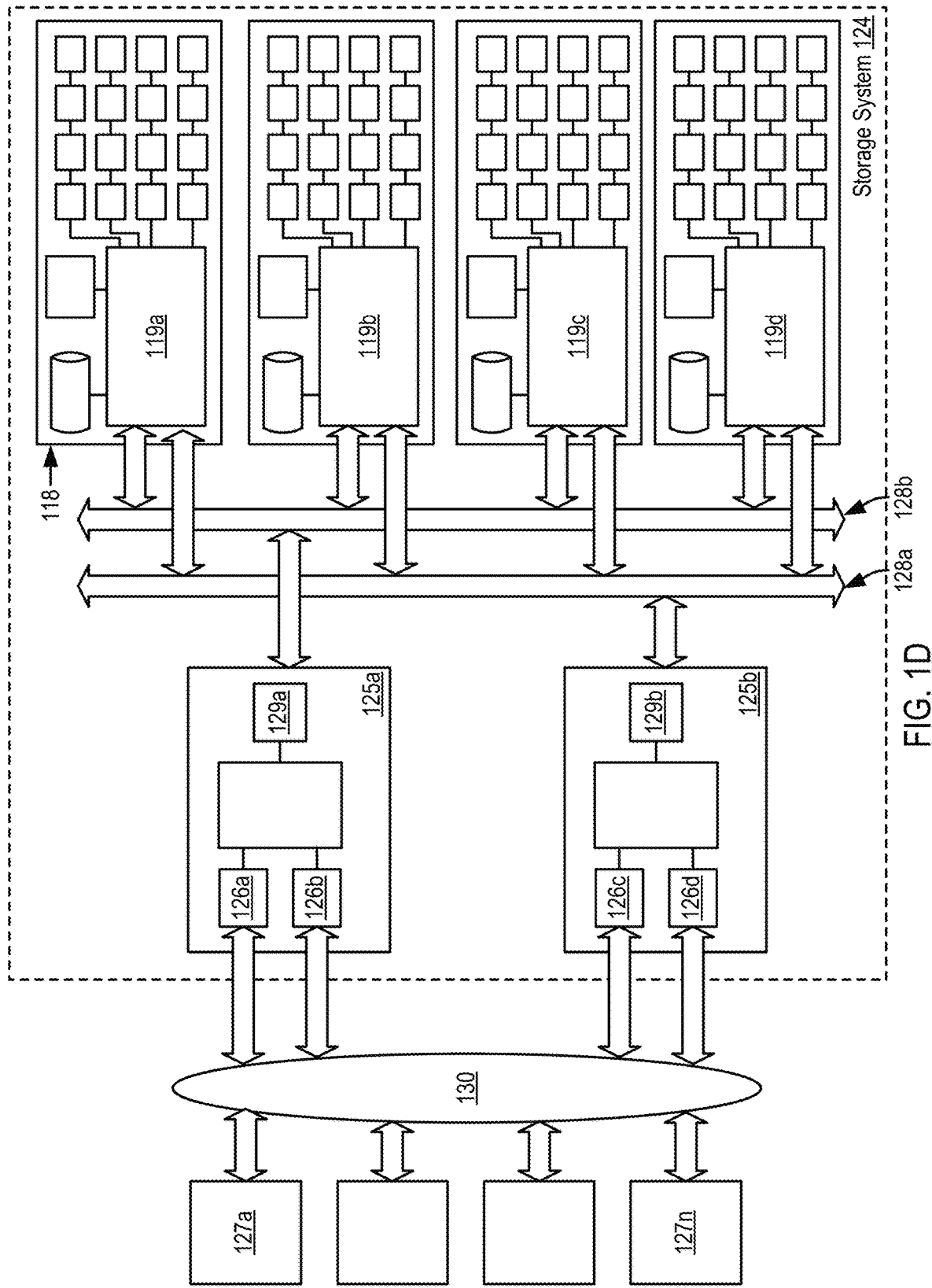
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to storage device controllers 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage device controllers 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a-d may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119a-d may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
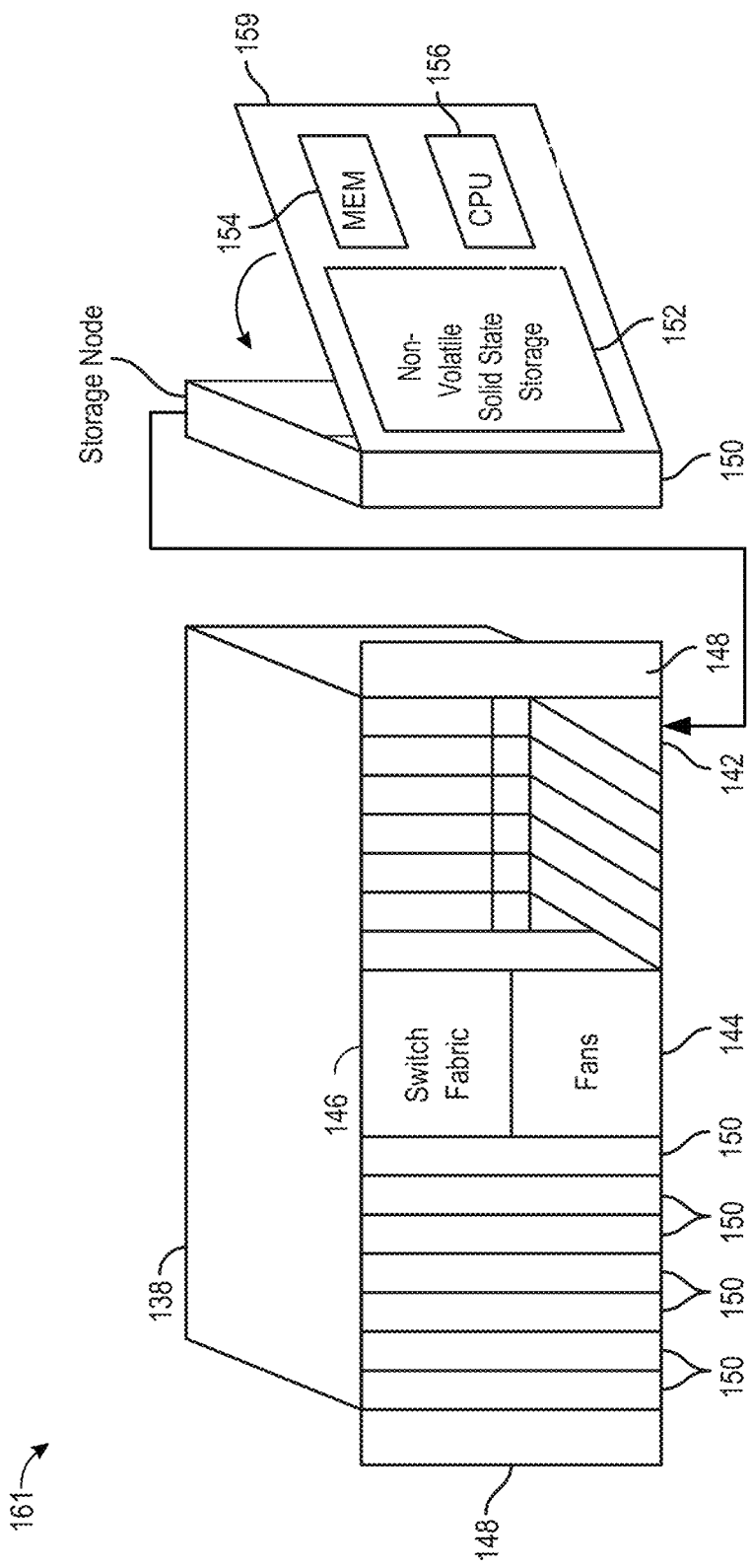
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
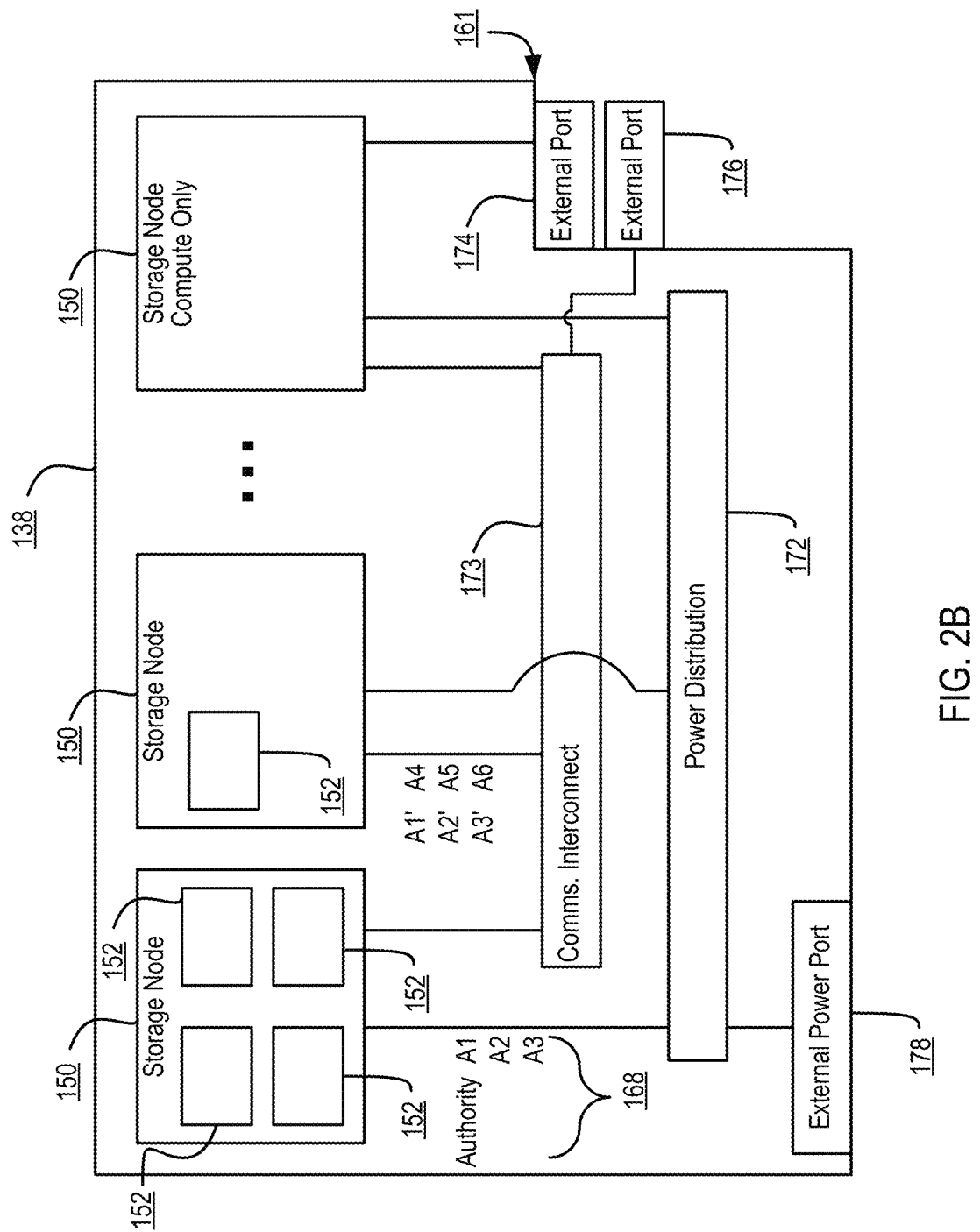
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots.

Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium.

Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
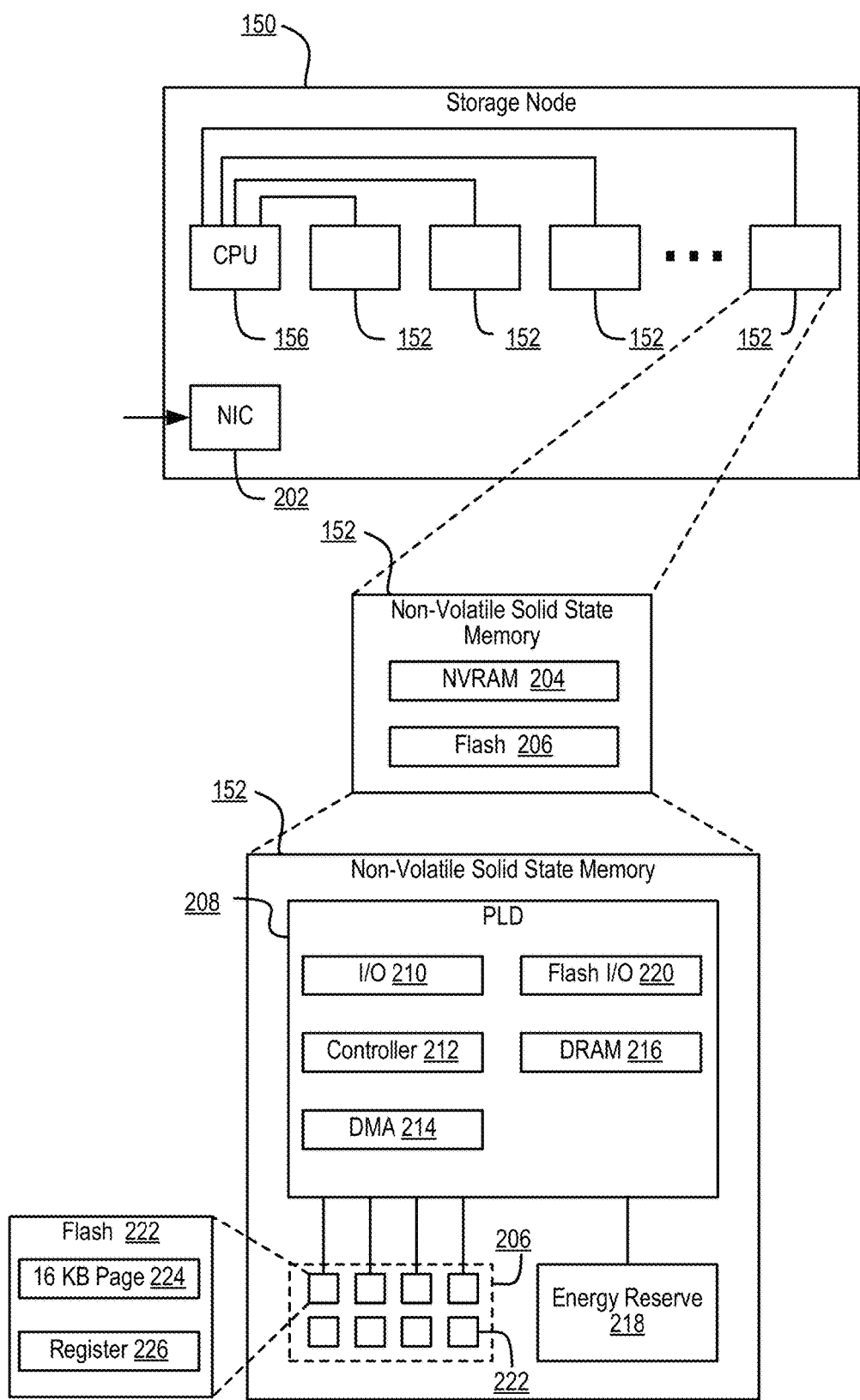
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
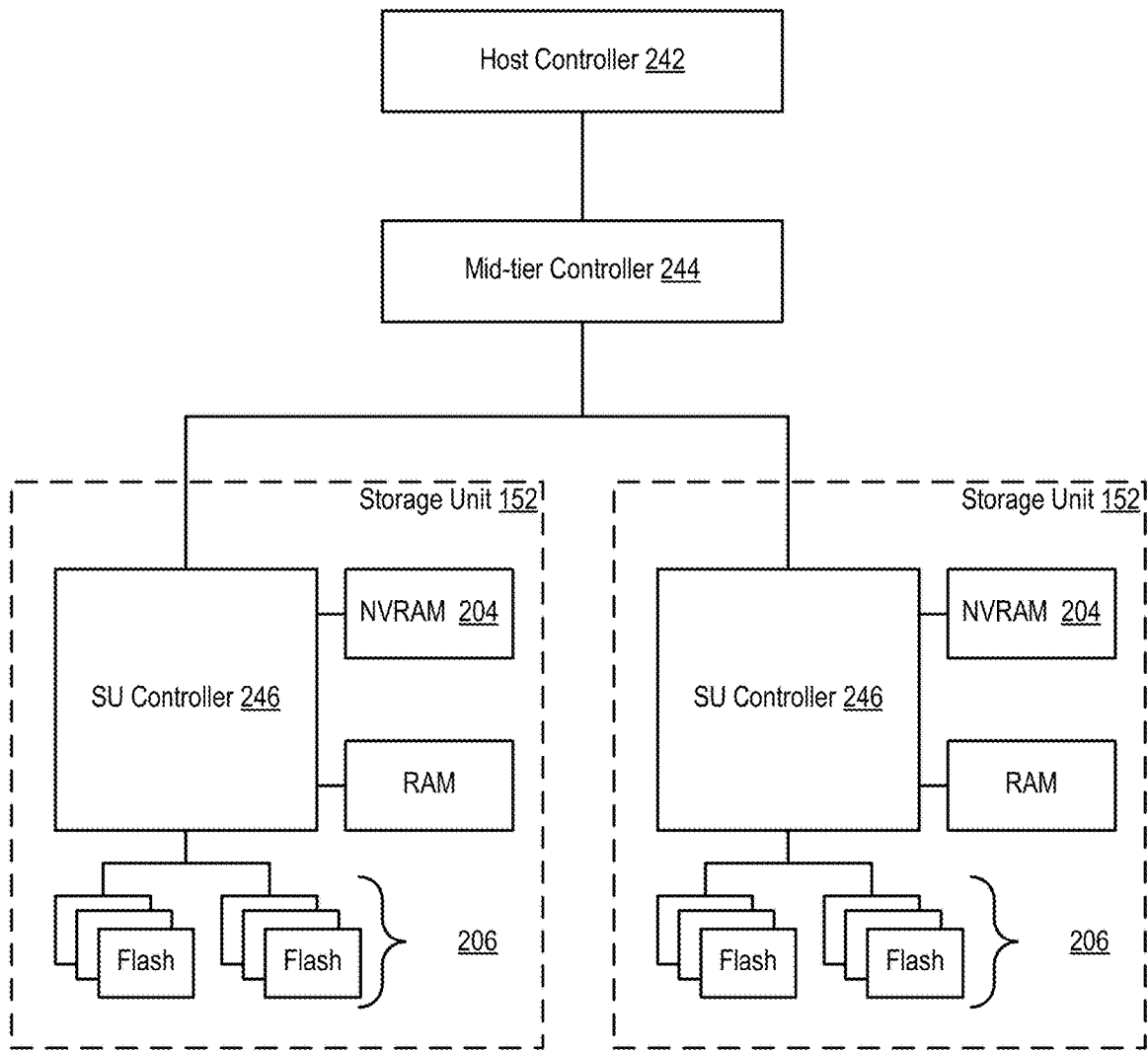
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
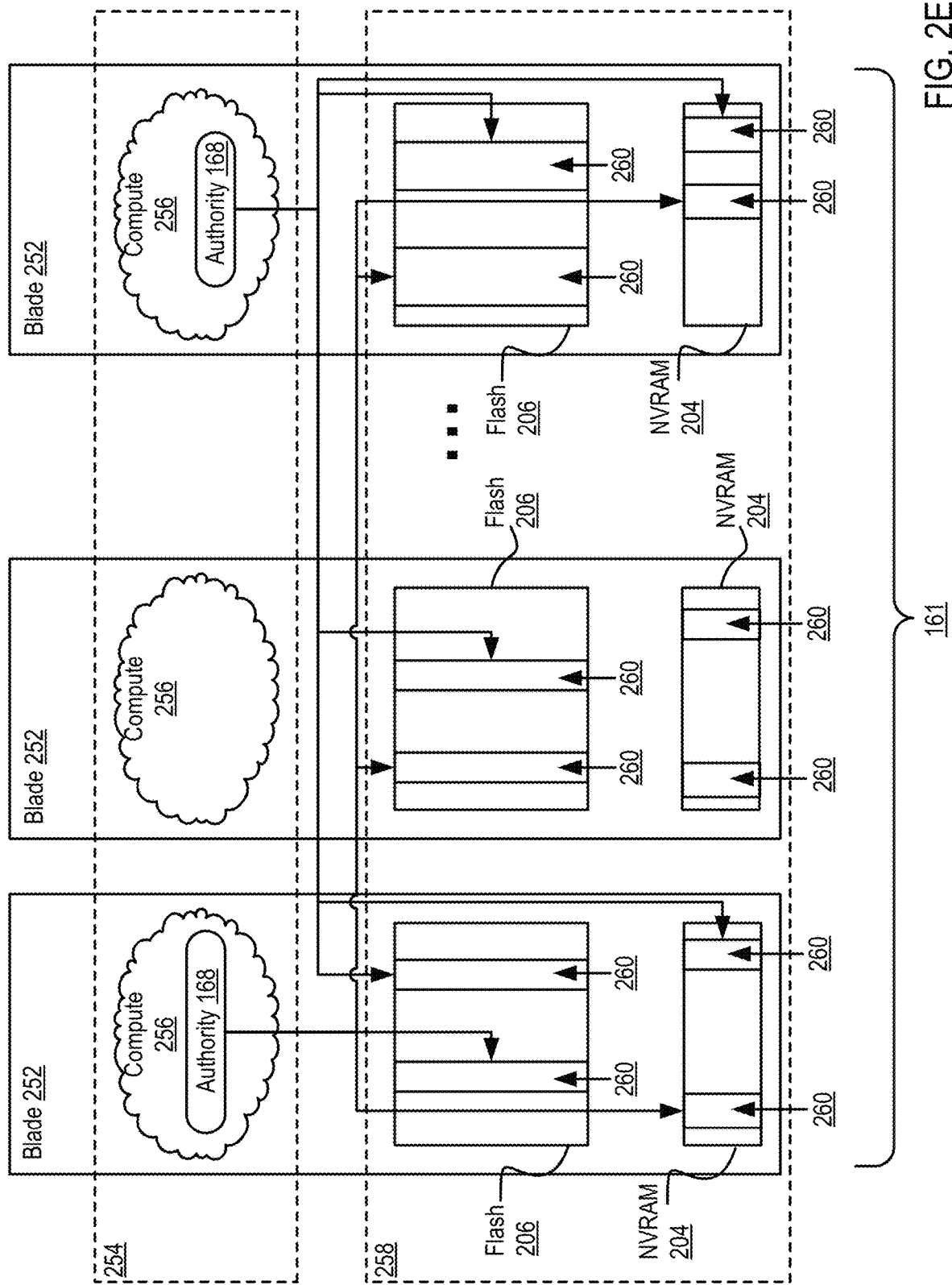
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
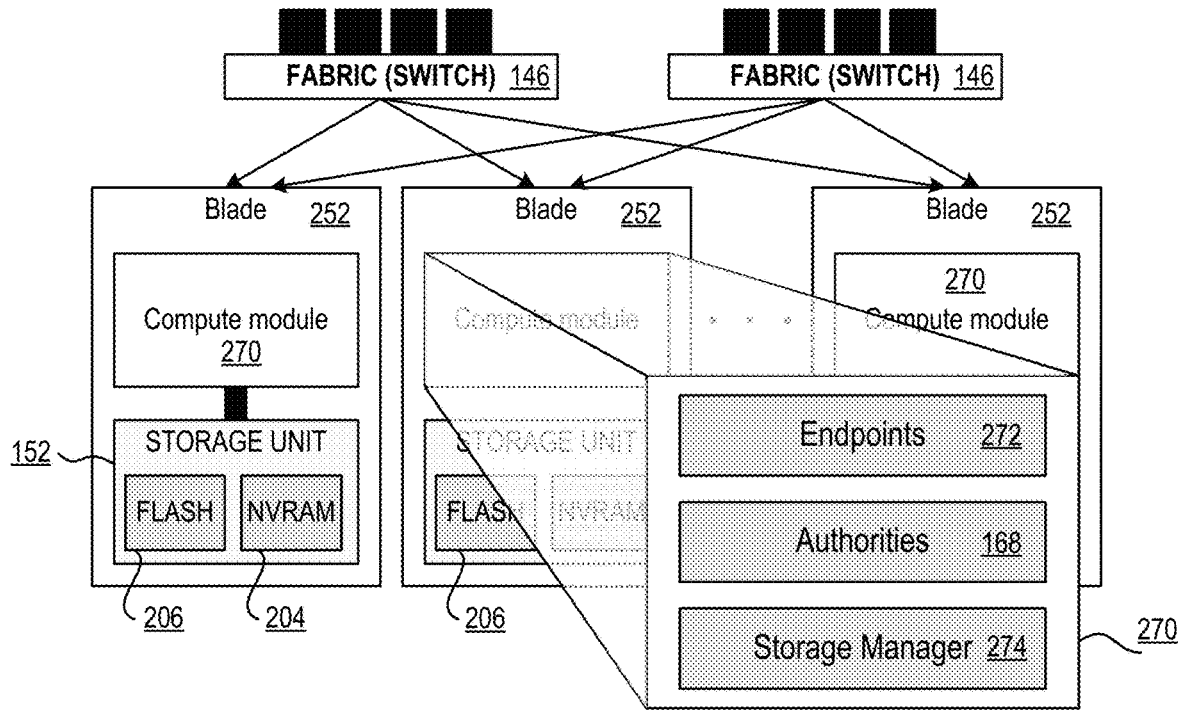
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
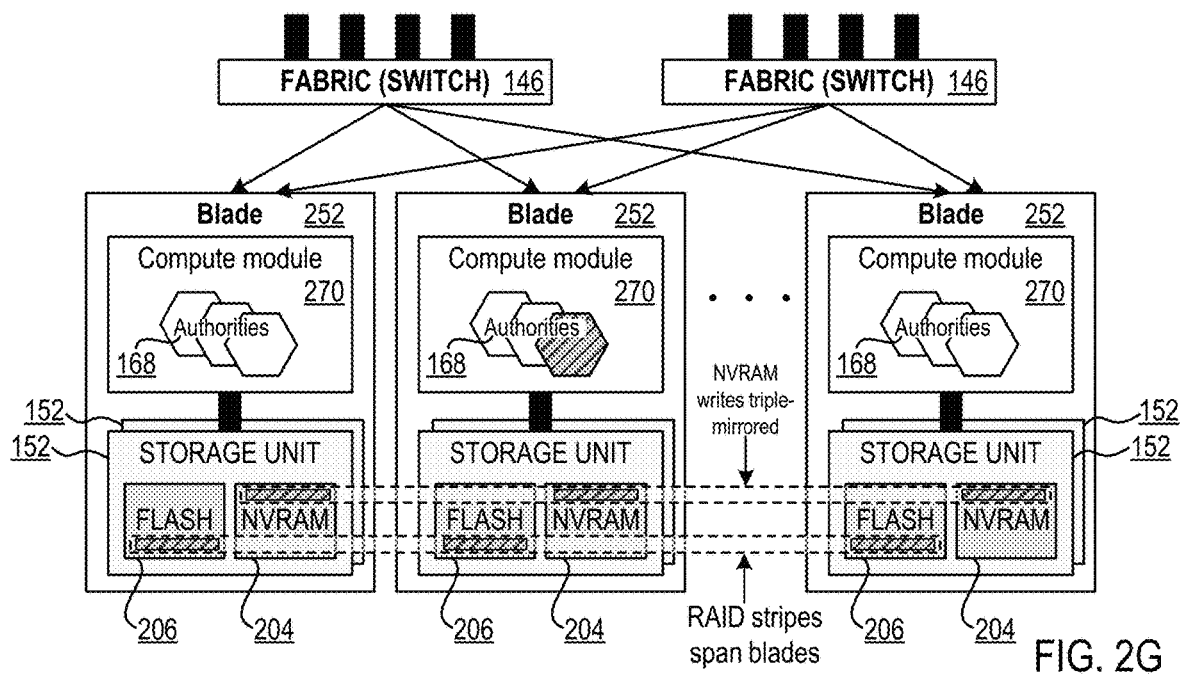
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach (e.g., hyper-converged infrastructures), or in other ways.

Readers will appreciate that the storage system 306 depicted in FIG. 3B may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. A GPU is a modern processor with thousands of cores, well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing, and many others. Training deep neural networks, however, requires both high quality input data and large amounts of computation. GPUs are massively parallel processors capable of operating on large amounts of data simultaneously. When combined into a multi-GPU cluster, a high throughput pipeline may be required to feed input data from storage to the compute engines. Deep learning is more than just constructing and training models. There also exists an entire data pipeline that must be designed for the scale, iteration, and experimentation necessary for a data science team to succeed.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID-6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Readers will appreciate that the storage systems described above may be configured to support the storage of (among of types of data) blockchains. Such blockchains may be embodied as a continuously growing list of records, called blocks, which are linked and secured using cryptography. Each block in a blockchain may contain a hash pointer as a link to a previous block, a timestamp, transaction data, and so on. Blockchains may be designed to be resistant to modification of the data and can serve as an open, distributed ledger that can record transactions between two parties efficiently and in a verifiable and permanent way. This makes blockchains potentially suitable for the recording of events, medical records, and other records management activities, such as identity management, transaction processing, and others.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also possible.

Readers will appreciate that the systems described above may be better suited for the applications described above relative to other systems that may include, for example, a distributed direct-attached storage (DDAS) solution deployed in server nodes. Such DDAS solutions may be built for handling large, less sequential accesses but may be less able to handle small, random accesses. Readers will further appreciate that the storage systems described above may be utilized to provide a platform for the applications described above that is preferable to the utilization of cloud-based resources as the storage systems may be included in an on-site or in-house infrastructure that is more secure, more locally and internally managed, more robust in feature sets and performance, or otherwise preferable to the utilization of cloud-based resources as part of a platform to support the applications described above. For example, services built on platforms such as IBM's Watson may require a business enterprise to distribute individual user information, such as financial transaction information or identifiable patient records, to other institutions. As such, cloud-based offerings of AI as a service may be less desirable than internally managed and offered AI as a service that is supported by storage systems such as the storage systems described above, for a wide array of technical reasons as well as for various business reasons.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models."

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. Likewise, machines like locomotives and gas turbines that generate large amounts of information through the use of a wide array of data-generating sensors may benefit from the rapid data processing capabilities of an edge solution. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

Consider a specific example of inventory management in a warehouse, distribution center, or similar location. A large inventory, warehousing, shipping, order-fulfillment, manufacturing or other operation has a large amount of inventory on inventory shelves, and high resolution digital cameras that produce a firehose of large data. All of this data may be taken into an image processing system, which may reduce the amount of data to a firehose of small data. All of the small data may be stored on-premises in storage. The on-premises storage, at the edge of the facility, may be coupled to the cloud, for external reports, real-time control and cloud storage. Inventory management may be performed with the results of the image processing, so that inventory can be tracked on the shelves and restocked, moved, shipped, modified with new products, or discontinued/obsolescent products deleted, etc. The above scenario is a prime candidate for an embodiment of the configurable processing and storage systems described above. A combination of compute-only blades and offload blades suited for the image processing, perhaps with deep learning on offload-FPGA or offload-custom blade(s) could take in the firehose of large data from all of the digital cameras, and produce the firehose of small data. All of the small data could then be stored by storage nodes, operating with storage units in whichever combination of types of storage blades best handles the data flow. This is an example of storage and function acceleration and integration. Depending on external communication needs with the cloud, and external processing in the cloud, and depending on reliability of network connections and cloud resources, the system could be sized for storage and compute management with bursty workloads and variable conductivity reliability. Also, depending on other inventory management aspects, the system could be configured for scheduling and resource management in a hybrid edge/cloud environment.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. Big data analytics applications enable data scientists, predictive modelers, statisticians and other analytics professionals to analyze growing volumes of structured transaction data, plus other forms of data that are often left untapped by conventional business intelligence (BI) and analytics programs. As part of that process, semi-structured and unstructured data such as, for example, internet clickstream data, web server logs, social media content, text from customer emails and survey responses, mobile-phone call-detail records, IoT sensor data, and other data may be converted to a structured form. Big data analytics is a form of advanced analytics, which involves complex applications with elements such as predictive models, statistical algorithms and what-if analyses powered by high-performance analytics systems.

The storage systems described above may also support (including implementing as a system interface) applications that perform tasks in response to human speech. For example, the storage systems may support the execution of intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

As used within the herein embodiments, some example features for storage system concepts are presented for storage systems, storage system elements, different types of durable storage, storage controllers, storage devices, storage device controllers, and combinations of these features. Further, additional examples of a memory component with multiple types of durable storage, multiple ways to address data, and multiple ways to implement durably stored data are described in application Ser. No. 15/697,540, which is incorporated herein in its entirety.

In some examples, a storage system may be considered to include a combination of hardware and software that implements capabilities for storing and retrieving data on behalf of servers, applications, databases, or any other software and/or hardware module configured to communicate with the storage system. A storage system may include data storage features and performance management capabilities. Further, a storage system may implement mechanisms that increase reliability by supporting continued operation and a reduced probability of data loss in the event of a variety of hardware or software component failures.

In some examples, a storage system element may be an identifiable part, component, or module within a storage system, where the part, component, or module may be implemented as a circuit board, power supply, fan, interconnect, or subcomponents thereof. In some cases, the storage system element may be implemented as a software module or application.

In some examples, durable storage may be a type of storage that is designed to retain stored content in the event of software crashes or faults, storage system reboots, storage system power loss, or failures of nearby, or connected, storage system elements, or some other type of fault.

In some examples, a storage controller may be a part of a storage system that implements, or at least coordinates, advertised capabilities of a storage system. A storage system may include one or more storage controllers to improve reliability, to improve performance, or to improve both reliability and performance.

In some examples, a storage device may be an element of a storage system that comprises physical durable storage to be presented to storage systems users, clients, or to other parts of the storage system, in addition to any other hardware, software, firmware, or combination of hardware, software, or firmware in order to present usable storage.

In some examples, a storage device controller may be part of a storage device that controls the storage device. A storage device controller may be implemented as a CPU, an ASIC, an FPGA, or software module that implements capabilities for managing durable storage and interaction capabilities of the storage device.

In some examples, an integrated controller and storage component may implement functions of a storage device controller and a storage device, as described above—where the integrated controller and storage component may be combined into a unified storage element, such as a removable circuit board, that implements both the storage device controller capabilities for interacting with the storage controller and the durable storage capabilities on other integrated controller and storage components. Further, the storage device capabilities of the integrated controller and storage component may be presented such that they may be used from the storage device controllers on multiple integrated controller and storage components. In some cases, CPUs and various controller chips may serve multiple, divided, or combined purposes across the two basic functions of implementing or coordinating the storage system capabilities versus managing the physical hardware elements to make stored data durable.

In some examples, a single storage device may include multiple addressable storage classes. In some implementations, storage devices may refer to generic SSDs, which generally emulate disk drives and usually provide a simple address range of blocks that is internally virtualized to map onto erase blocks dynamically, such as using a Flash Translation Layer. In other cases—particularly in the case of fast durable storage, mapped durable storage, or durable registers—storage devices are presumed to include one or more of the following components: addressable fast durable storage, addressable bulk durable solid state storage, and a storage device controller.

In some examples, addressable fast durable storage may be storage with high bandwidth and low latency that supports a high number and rate of overwrites. Fast durable storage may be addressed with PCI transactions, for example NVMe, with direct memory addressing by a CPU on a separate computer system, for example, a separate storage controller, or with some other communication channel or protocol. Addressable fast durable storage may be a logical construct that makes use of hardware that serves multiple functions. Fast durable storage may be implemented in multiple ways, including: persistent high-speed memory, for example, 3D Xpoint; volatile RAM coupled to a storage device controller and a battery, capacitor, or generally an energy source with sufficient energy to transfer data stored in RAM to a different nonvolatile storage—such as reserved bulk solid state storage—in cases of loss of external power or loss of a primary source of power. In other words, to be durable, transferred data from RAM into the other nonvolatile storage is identifiable and retrievable at some time subsequent to loss of power to RAM, or during recovery from some other type of fault. In some cases, other types of fast durable storage memory types may be used, such as low capacity enterprise single-level cell (SLC) Flash memory, where the fast durable storage is designed for high bandwidth, high overwrites, higher lifespans—which may result in the fast durable storage having a higher price, or lower density per bit than other types of solid state durable storage that may be used for long term storage.

In some examples, addressable bulk durable solid state storage may be designed for lower cost and higher density, where the lower cost and higher density may be in exchange for higher write or access latency and reduced lifespan in the face of high overwrite rates. One example is flash memory, and in particular, multi-level cell (MLC), triple-level cell, or quad-level cell (QLC) flash memory that stores two, three, or four bits per flash memory cell at the expense of reduced bit-level reliability, increased write latency, more disturbance of nearby read operations, or reduced lifespans in the face of flash erase block reuse. An encompassing storage device may use various techniques to optimize performance or reliability of this type of bulk storage, including internal use of fast storage as a frontend to respond more quickly or to allow multiple operations to be organized more effectively or to implement internal atomic operations related to bulk memory operations.

In some examples, a storage device controller may be configured to perform one or more of: receiving processing requests to store or retrieve data from addresses associated with fast durable storage on the storage device; receiving and processing requests to store or retrieve data from addresses associated with bulk durable storage on a storage device; receiving and processing requests to transfer data from fast durable storage on a storage device to bulk durable storage on the storage device; or in response to a power failure, transfer content from volatile memory that is part of an implementation of fast durable storage to bulk durable storage using stored energy from a battery, capacitor, or some other energy storage device. Further, a storage device controller may use CPUs associated with general storage device controller functions or may use dedicated or secondary function low-power CPUs, or this may be a feature built into an FPGA or ASIC.

A storage device may further support one or more of the following features, with corresponding implementations to: (a) map a region of fast durable storage as I/O memory or virtual memory to one or more CPU cores or I/O memory controllers on a storage controller, such that CPU store operations or DMA transfers to I/O memory or virtual memory can be persisted in case of power failure, where this I/O memory or virtual memory can be written to directly from a storage controller's CPU instructions with few operations system scheduling delays; (b) receive requests to store an integer value (e.g., an 8 byte, 16 byte, or 32 byte value) into one of an index of memory locations, where the memory locations may be referred to as a type of register, where the registers are durable in case of power failure, where durability may be implemented by writing into a dedicated region of durable fast storage; these received requests may be piggybacked with other requests, such as to be applied before or after or at the point in time the other request is processed to the point of being durable; (c) operate using the NVMe Storage Performance Development Kit API, or some alternative API that supports high-speed storage operations without the need for completion interrupts; such an API may exclusively support fast durable storage, or may be supported for both fast and bulk durable storage on the storage device—or the storage device may internally utilize some of the fast storage at its front-end, where such operations may be addressed to addressable bulk storage; (d) receive requests to transfer contents of fast durable storage or bulk solid state storage to the fast durable storage or bulk solid state storage within the storage device, or in some cases, to the fast or bulk storage of another storage device within a storage system that included multiple storage devices; (e) provide multiple interconnect interfaces, such as based on dual NVMe, SCSI, or Ethernet interfaces, to improve reliability in cases of internal storage system interconnect faults, or to improve performance by providing multiple pathways within the storage system, or allowing dedicated pathways to each of, for example, one or more storage controllers; and (f) provide directly addressable pages and erase blocks to storage controllers for a set of flash memory chips that include the storage device's bulk durable storage, thus allowing the storage controllers to handle wear leveling, failed erase block management, and other aspects of managing flash memory life cycles that are otherwise often handled by a controller chip paired with flash memory chips on storage devices themselves.

In some implementations, a storage system may be built from a collection of storage devices, including some number of storage controllers that implement or coordinate the features and logic for the storage system itself. An example of such a storage system is depicted within the storage system architecture of FIG. 1D. Further, storage controller logic may implement logic to create a reliable storage service that may survive failures such as faults of storage devices, individual elements of storage devices, individual storage controllers, storage controller, or storage device logic, power supplies, or internal networks-all while continuing to operate and provide storage system services. Such storage system services may include implementing a SCSI storage array, an NFS or SMB based file server, an object server, a database service, a service for implementing extensible storage related applications, or combinations of such services. Storage operations may include creating snapshots, replication, online addition or removal of storage devices or trays of storage devices or storage controllers or power supplies or networking interfaces, or administrative operations such as creating, modifying, or removing logical elements such as volumes, snapshots, replication relationships, file systems, object stores, application or client system relationships, among other operations.

In some implementations, storage devices may store and retrieve data on behalf of—or coordinated through—storage controllers, largely at the direction of storage controllers, and are generally otherwise relatively passive participants in contributing to the overall implementation of a storage service. However, in some examples, storage device may be additionally configured to assist, or offload, storage controller functions in order for the storage controller to provide more efficient services, such as by a storage device partially implementing garbage collection, data scanning and scrubbing, or other such services, or aiding in bootstrapping the storage controllers.

For further explanation, FIG. 3C sets forth a diagram illustrating an example integrated storage controller and device elements that integrates accessible fast bulk storage into a bulk storage device, referred to here as a unified storage element (320), where a storage system (124) may be implemented using multiple unified storage elements (320). Although depicted in less detail, the unified storage element (320) depicted in FIG. 3C may be similar to the storage systems described above with reference to FIGS. 1A-1D and FIGS. 2A-2G, as the unified storage element (320) may include some or all of the components described above.

In the example architecture depicted in FIG. 3C, multiple storage controllers (125) and multiple storage devices are integrated into a unified storage element (320), where the unified storage element (320) may be removable as a whole or that may be on a single circuit board, or that may be controller by a common CPU or controlled by multiple CPUs, FPGAs, or ASICs—where each such unified storage element (320) within a storage system serves as both storage controller and storage device functions. In such a storage system, the storage controller function of a unified storage element (320) may access the storage device function on a plurality of unified storage elements, configured similarly to unified storage element (320), within the storage system. In this example, the storage controller function might be able to access the storage device function on other unified storage elements within the storage system, such as through internal networks within the storage system, or the storage controller function on a first unified storage element might have to go through the storage controller function on a second unified storage element to get the unified storage element storage device function.

In some examples, a reference to a storage device may refer to either a separate storage device within a storage system or to the storage device function within a unified storage element (320) within a storage system. Further, in other examples, a reference to a storage controller may refer to either a separate storage controller within a storage system or to the storage controller function within a unified storage element (320) within a storage system.

In another implementation, a storage system may include various combinations of elements comprising dedicated storage controllers without integrated storage device capabilities, storage devices without integrated storage controller capabilities, or combined storage controller and device elements. Such combinations may be useful for migrating a storage system from one generation that operates in one way to another generation that operates in a different way, or aspects of scale may dictate some extra numbers of one function versus another functions—for example, a bulk archive storage device including a large number of extended storage devices in a system whose core is built from combined storage controller and device elements, or a performance oriented device that needs performance or external interconnects might benefit from additional storage controllers, but without benefitting from additional durable capacity.

In some examples, a storage system may be configured to be reliable against complete failure of one or two or more storage devices using erasure codes, such as erasure codes based on single or double parity, as with RAID-5 or RAID-6, or against uncorrectable faults, corruptions, or complete failures of individual elements within a storage device—such as individual pages or erase blocks in flash memory or of individual chips—by reconstructing content from elsewhere within the same storage device or through the single and double parity protection used for complete device failure. In other words, in some examples, the various memory components of a unified storage element (320), individually or in combination, may be used to implement multiple, different RAID levels or combinations of RAID levels. In the following examples, a RAID stripe is data that is stored among a set of memory regions mapped across a set of storage devices, where each memory region on a given storage device stores a portion of the RAID stripe and may be referred to as a "strip," a "stripe element," or a "shard." Given that the storage system (306) may simultaneously implement various combinations of RAID levels, a "RAID stripe" may refer to all the data that is stored within a given RAID stripe corresponding to a given RAID level. Generally, in the following examples, a stripe, stripe element, or shard is one or more consecutive blocks of memory on a single solid state drive—in other words, an individual stripe, stripe element, or shard is a portion of a RAID stripe distributed onto a single storage device among a set of storage devices. In this way, a RAID level may depend on how the RAID stripe is distributed among a set of storage devices. With regard to erasure coding, generally, erasure coding may be described in terms of N+R schemes, where for every N units of content data, an additional R units of redundancy data is written such that up to R failures may be tolerated while being able to recover all N units of content data. For example, RAID-5 is an example N+1 scheme, whereas RAID-6 describes a set of N+2 schemes. In other examples, a scheme may be based on Galois Fields, or other types of mathematics that can cover a wide range of N and R combinations. In some examples, RAID parity calculations are a merger of parity calculations for multiple partial erasure coded parity calculations within a Galois field for partially filled data stripe updates. Specifically, in some cases, each given storage device within a storage system may, by default, detect faults locally and directly using, as some examples, a checksum or mathematical integrity check for all data that is read or written to the given storage device. However, in cases where a given storage device in a storage system does not perform local fault detection, other techniques may be applied, such as various coding techniques that store additional shards beyond a fault tolerance (e.g., three parity shards that are usable to recover up to two faults and up to one unit of additional corrupted data), or through the use of encoding all data, including parity or redundancy data, in a manner that can be used to detect corrupted data. In general, in the embodiments described herein, a local storage device will, by default, perform localized data integrity checks, where data shards and redundancy shards may be distinct from each other. However, in some examples, no such restriction to, or reliance upon, localized integrity checking is presumed.

It should further be noted that erasure coding schemes may be used within a storage system in a variety of ways. Traditional storage systems, which were originally designed for spinning disk storage devices, typically allocate large RAID-5 and RAID-6 layouts relatively statically as a set of relatively large, such as multi-gigabyte, N+R shards, where each shard is a unit of stored content data or a unit of stored redundancy data. In such schemes, overwrites of previously stored content includes replacing existing content data shards and calculating and replacing existing redundancy data shards using some sequence of steps to ensure that the operations may be done safely in the event that a fault occurs during the sequence of steps. In some cases, these sequence of steps may be computationally intensive, for example, in some cases, the sequence of steps includes reading old content and redundancy data, or reading from most existing content data shards at the same logical offset in a RAID layout in order to calculate new redundancy data. In other examples, the sequence of steps may include multiple persisting steps in order to ensure that an interrupted operation can be recovered when safe operation resumes.

In examples using spinning disk storage, faults may include corrupted blocks, which can generally be corrected by overwriting them to correct a temporary coding error on the spinning disk, or by allowing the spinning disk to revector a bad block to an alternate location. Spinning disks may also suffer from electrical or mechanical failure from problems driving their electric motor, seizing of the electric motor, or failure of a read/write head or actuator. In some cases, sudden and excessive vibration can cause a read/write head to crash, or physically make contact, with a spinning disk surface, thereby damaging the head or scratching the disk surface, or scattering particles within a hermetically sealed device. In other cases, electronics can fail or the hermetic seal may be damaged, thereby exposing the internal components to an uncontrolled environment with moisture or dust particles that may lead to disk failure. In short, while spinning disks may generally be reliable, there are a great many ways in which a spinning disk may encounter a catastrophic failure; however, there are exceptions where failures may be fixed with internal recoveries and rewrites for the occasional bad sector or bad track, or runs of a few bad sectors or bad tracks.

By contrast to spinning disks, solid state storage does not suffer from mechanical failures, and performance is not affected by vibration, and it is unlikely that a solid state storage device causes voltage spikes or other electrical issues. Further a solid state storage device is not generally a single device, but rather a collection of individual integrated circuits, or a collection of regions within a particular integrated circuit that may age and fail separately, such as due to a flash cell's limited number of erase/recycle cycles or due to chip-to-chip or cell-block-to-cell-block manufacturing variations. However, performance of some solid state storage device technologies, in particular flash based storage devices, can be greatly affected by internal operations related to erase block writing, erasing, or other management operations or—particularly for TLC and QLC flash devices—reads performed on nearby cells. Individual elements within solid state devices that do their own garbage collection can become slow or unresponsive for periods of time when garbage collection is being performed. Flash, in particular, can have much higher rates of individual damaged blocks, or of unusable blocks, than disk, and may require more internal error correction and more spare blocks. Given the way flash memory works, advertising a much lower available capacity than the raw physical capacity may be used to extend the lifespan of flash drives by reducing the frequency of erase cycles that result from random overwrites and delaying garbage collection. Such lifespan extension techniques may be coupled with algorithms to randomize the locations of written data, perhaps with biases against or in favor of blocks that have been erased more times than other blocks in dependence upon an expected longevity of the stored data.

Generally, flash does not suffer from slowdowns due to randomization of data locations because given that there is no mechanical delay in reading a block, any read unaffected by a concurrent write or a concurrent garbage collection is generally quite fast irrespective of whether previous, subsequent, or concurrent reads are from nearby or farther away locations or logical addresses. In some cases, a penalty for turning relatively sequential reads into relative random reads is so high for disk, that disk based storage systems generally avoid randomizing locations of data so that logical sequential reads by applications stay sequential on disk, which is part of why it is so common for RAID-5 and RAID-6 mappings to be kept relatively static, with the mapping retained when data is overwritten (some files system based models such as ZFS are exceptions to this). In short, in the case of spinning disks, small overwrites to RAID-5 and RAID-6 datasets often require a read-old-data, read-old-parity, write-new-data, write-new-parity sequence that can be quite expensive. Simpler mappings used for disk-based storage systems also reduce the amount of index data that has to be kept and managed in order to determine where a block is stored. In particular, if a random read requires reading both an index block—to figure out where a block is stored—and the block itself, then that includes two random reads, and two mechanical delays, which is even worse from a performance perspective because latency may double and throughput may be reduced due to limited available IOPS.

Further, because solid state storage does not have mechanical delays inherent in spinning disks, an occasional or even frequent extra read to figure out where a block resides does not incur a high performance penalty, consequently, scattering data as it is written (resulting in a large index that can exceed available cache memory that results in the need to read the index in order to locate data) has few downsides. For example, performance impact for a small read performed before a large read is performed will be negligible. Further, bandwidth for servicing a large sequential read request by issuing a set of smaller physical random reads (the result of scattering content on writes and overwrites) is generally only a bit less than the bandwidth for servicing large sequential read requests by issuing a small number of larger physical reads. By contrast to solid state storage, with spinning disks, IOPS limits can result in throughput hits from randomized data locations that can be multiple orders of magnitude if stored logically sequential data is physically highly fragmented.

Consequently, because of the different characteristics of spinning disks and solid state storage, solid state storage solutions generally avoid overwriting stored data by writing to new locations and onto fresh erasure coded stripes as data is persisted. Data may be written into N dynamically allocated shards of a few kilobytes to a few megabytes as content data is written, with R matching redundancy shards allocated and written to match, thereby achieving N+R recoverability. Such a protocol for processing writes avoids replacing existing data in place, thus avoiding the need to modify in-place redundancy data in place through some safe update scheme. Collections of stripes may then be written out based on whatever patterns achieve the best write throughput, where throughput of later read requests depends on the high IOPS rates of solid state storage that is often limited by available throughput of I/O interconnects instead of limited by delays in switching between sectors—at least as long as the storage devices are properly optimized and include a sufficient number of flash chips.

In some implementations of a unified storage element (320), erasure codes may be used to ensure that any completely written data can survive one or more device failures, or a combination of a device failure and a localized data corruption or segment failure. Further, reliability may be increased further by adding erasure codes within a storage device, such as by calculating erasure codes that operate across pages, erase blocks, or chips within an individual storage device. With this further reliability, rare cases of an isolated, corrupted or unreadable, block, erase block, or chip within a storage device may be recovered internally without relying on additional storage devices. This further reliability is helpful in cases where undetected, and thus uncorrected, isolated errors exist for an extended period of time, consequently exposing the storage system to data loss in cases where two other storage devices fail entirely or are removed from the storage system due to accident or as part of a procedure to replace older drives within newer ones, and the latent isolated corrupted blocks cannot then be corrected by an N+R redundancy technique. In dependence upon uncorrected errors within a device being rare or having a low probability of occurring, redundancy data across pages, erase blocks, or chips may be written in either a lazy fashion or as data ages. In this example, these lazy writes may result in some lost intra-device redundancy in cases of power failure, but there may be a very low likelihood that this small amount of lost intra-device redundancy may be needed to recover on restart from a rare localized uncorrectable error coupled with a simultaneous failure for R devices to startup. Bandwidth for writing data in such a storage system may often be improved by writing several stripes at once. Writing several stripes at one may be done by keeping multiple stripes open for further updates to allow use of all storage devices under heavy loads and to allow activity to be balanced across large numbers of erase blocks (in the case of flash) or large numbers of solid state storage chips. Keeping multiple stripes open to maximize parallelism across erase blocks, chips, or storage devices may depend upon custom storage devices and networks or buses that support large numbers of parallel transfers. Bandwidth for reading data generally depends upon support for a large number of parallel transfers between storage controllers and storage devices. Getting the best read throughput may also need to account for, or schedule around, particular flows of writes to storage devices, storage device and internal network channels, solid state chips, or flash erase blocks in order to reduce contention with write-related operations. Reads that may be slowed down by write contention, or that may severely slow down write operations themselves (as is common in flash devices) might be delayed, might delay write operations, or might look for alternate means of reading data, such as recovering data from erasure codes stored within or across storage devices.

In some cases, stored data may be stale or no longer useful while continuing to occupy storage space, such as, for example, data that has been written and scattered, and overwrites that are separately scattered from the data they overwrite, and deletion of data through deleting snapshots or volumes or through UNMAP or TRIM requests, or through SCSI Extended Copy or similar types of requests. Generally, some garbage collection process may identify pages or segments or erase blocks that are no longer used, or that are no longer used completely, and move whatever useful data remains in a segment to another memory location, and then allowing pages or segments or erase blocks to be used for new stored data. In the case of flash memory, erase blocks may be garbage collected and erased before they can be reused for new data.

In some implementations, further optimizations may be based on a storage model, such as staging speculative writes through fast memory of a unified storage element (320). For example, in some storage systems, there may be a write into some kind of fast storage to record an operation, or record operation results, in a way that makes the operation or the results persistent more quickly—thus enabling one or more of the following benefits, including: (a) enabling operations to be signaled as completed faster; (b) enabling internal storage system processes to be unblocked more quickly while allowing a larger queue of changes to be built up for writing to slower bulk storage; or to reduce the likelihood of temporary data, which may be overwritten quickly, from being written to bulk storage in the first place, thereby improving flash lifespans; or (c) enabling multiple operations to be merged together for more efficient or better organized storage operations, thereby improving flash lifespan as well as potentially increasing throughput. Further, if individual storage devices in a storage system provide both fast durable storage (such as 3D Xpoint memory or DRAM backed by a battery or capacitor which is written to flash on power failure) and bulk storage (e.g., bulk MLC, TLC, or higher bit-per-cell Flash), then the typical means of staging through fast storage may be improved. In a typical storage system implementation, a storage system writes to fast storage, for example, by writing at least two copies into at least two separate fast memories each on separate storage devices, and, sometime later, the storage system writes that data to the bulk storage. Such a write operation implementation may result in two sets of transfers from storage controllers to various storage devices, one set of transfers to fast storage, another set of transfers to bulk storage. These two sets of transfers use considerable extra bandwidth between storage controllers and storage devices because the same data is transferred at least twice, and possibly more than twice. For example, staging a content data write by writing three copies to fast storage on three storage devices followed by grouping of data together into an N+2 erasure coded stripe may result in total bandwidth that is over four times the size of the write itself. This consumption of bandwidth may be reduced by using an M+2 encoding for storing into the fast durable staging space—where M is a separate number of content data shards, which are then coupled with redundancy data shards for writing to fast staging space; however, there may still be bandwidth usage that is over two times the size of the write itself.

One example for reducing this bandwidth overhead is for the storage device to use the fast storage as internal staging space, acknowledging the write more quickly to storage controllers, and then writing to bulk storage at a later point in time—where the later write to bulk storage from fast storage may be invisible to the storage controllers because to the storage controller, the write was persisted, or durably stored at the moment that the write was acknowledge. In some cases, such a write protocol—where a storage controller is unaware of internal transfers of data—may eliminate the need for separately addressable fast durable storage. However, there is significant flexibility to be gained by allowing the storage controllers to manage the process of transferring data between fast storage and bulk storage, rather than having the storage devices do these transfers implicitly behind the scenes and hiding the fast durable storage from the storage controllers. In other words, storage system implementations gain a lot of flexibility for optimizing their overall operations by allowing higher level aspects of the implementation to record to fast persistent storage early in a processing pipeline, and losing that flexibility to gain reduced backend bandwidth may be an unacceptable tradeoff.

In some embodiments, a solution to reduce bandwidth for backend data transfers is to utilize staging a write through fast storage. In this example, if the write is first written as three copies to fast storage on the respective fast storage of three separate storage devices, where the contents of that multi-copy write are aggregated with the contents of other writes to form an N+2 protected stripe in bulk storage, then if one of the storage devices selected serving as fast storage is the same storage device to be selected for the eventual write to bulk storage, then the extra storage-controller-to-storage-device bandwidth for transfer to the bulk storage may be avoided by the storage controller instructing the storage device to transfer that data from fast storage to bulk storage. In some cases, avoiding extra transfers may be achieved by transformations such as merging. In this example, the other two storage devices that stored a respective copy in fast storage retain their respective copy until the final N+2 stripe has been written and committed, but otherwise outside of a fault and recovery sequence, the other two storage devices do not need to perform additional, corresponding, write or copies of the respective copies. In some examples, the format of data written to fast storage is identical to the format of data written to bulk storage, and consequently, no data transformation is needed prior to a transfer. In other cases, where the format of data written to fast storage is not identical to the format of data written to bulk storage, the transfer may include transforming the content during the transfer from fast storage to bulk storage, where the transformation may be based on instructions from a storage controller, and possibly in coordination with merged content from other stored writes in fast durable storage.

In some examples, transfers to fast storage from bulk storage or from fast storage to bulk storage may operate simultaneously, where such parallelism may increase bandwidth or reduce locking contention issues within a storage controller software implementation. For example, separate CPU cores in a storage controller may use separate channels to storage devices, thereby eliminating locking contention while gaining bandwidth for every storage controller CPU core that transfers to storage devices.

Further, separation of transfers into fast storage from the transfer of content from fast storage to bulk storage allows further types of optimizations. For example, data may be written as $M+R_1$ stripes in fast bulk storage to be stored in an $N+R_2$ stripe in bulk storage, or data may partially or completely fill a subset of shards within an N+R stripe resulting in intermediate M+R stripes where M<N. In some example, R, $R_1$, and $R_2$ may be equal, but in other examples, may be defined to be distinct values. Further, as an example, within a 10+2 stripe, there may be enough accumulated data to write partial segments as a 5+2 stripe, thereby allowing fast write data to be written with reliability against two failures, but with only 40% additional overhead rather than 200% additional overhead that would be required for writing 3 complete copies. In this example, after all of the N+2 shards are complete, the corrected P and Q parity (given a RAID-6 erasure code format) may be written to storage devices, and the storage devices with fast durable storage that includes the completed data shards may be instructed to write the completed data shards from fast storage to bulk storage.

In this example, the overhead of a write of three independent copies to fast storage followed by an optimized N+R transfer to bulk storage may incur bandwidth consumption such that slightly more than three times as much data to be transferred from storage controllers to storage devices—compared with four times as much without the instruction to transfer from fast storage to bulk storage within a storage device. However, the previous example may reduce the overage transfers in between fast storage and bulk storage to 160% of the total data—and in examples with wider stripes, the overhead could be reduced further still.

In some examples, multiple M+R partial stripes may be written concurrently into fast storage, including for the same N+R stripes or for different stripes. In this example, each M+R stripe may be protected by its own partial or complete parity shards. The partial or complete parity shards should be identifiable in the written data, such as by recording the M+2 layout in the content written out to each section of fast storage, or by recording a sequence number or other identifier that can be compared across storage devices during some later recovery.

In some embodiments, a variation may be to interleave small writes across partial sections of most or all shards of an N+R stripe, calculating, say, P and Q one section at a time. When the complete contents for an N+R stripe are available, a storage controller may instruct the storage devices to transfer now complete shards to respective bulk storage. In some cases, the format of the partial stripes may include headers or other information that differs slightly from the format that will be written to bulk storage; if so, the storage device may be instructed to transform the format and to calculate updated redundancy shards.

Further, if data is accumulated in fast storage for some period of time before being transferred to bulk storage, then the storage controllers may determine that some of the content is no longer needed, or will not be requested, and in response this determination, the storage controllers may partially or completely avoid a transfer to bulk storage. Avoiding such transfers may occur based on the determination that data has been overwritten, or if the data is metadata that has been reorganized or optimized. Avoiding such transfer may also happen in cases where deduplication operations include determining that some data has already been written to the bulk storage somewhere in the storage system, thereby avoiding the transfer of data that already exists. In other examples, partially replaced data, such as in the case of M+R stripes or partially written shards in an N+R stripe might become invalid or unnecessary before being transferred to bulk storage, and as a result, parts of the final N+R stripe may be replaced, eliminated, or reorganized prior to any such transfer.

In different embodiments, because fast storage space may be limited, the storage system implementation ensures that data that is to ultimately be written to bulk storage is actually written to bulk storage and made reliable across storage devices in a sufficiently timely manner that the storage system does not normally have to pause waiting for fast storage to be freed up for reuse.

In some implementations, consistent recovery may be performed with varying subsets of storage devices. For example, if a storage controller fails and reboots, or one controller fails and another controller takes over for the failed controller, or when some number of storage devices go offline and then come back online, or when a storage system is stopped through some sequence of events (power failure, power surge, an inadvertent administrative shutdown command, or a bug, among other examples), the storage service may have to be restarted and recovered from the available storage devices. During that recovery, there may be a second event that results in the storage service going offline and then later being recovered, and that sequence of interrupted recoveries may repeat itself many times. During each recovery, a different set of storage devices may come online, or some storage devices may come online much slower than other storage devices, resulting in the storage service deciding to recover from the online storage devices, but with a different set of such storage devices each time. Such a sequence of interrupted recovering may present an issue for data that is stored redundantly across storage devices, such as through writing the same data to multiple such storage devices (RAID-1 or mirroring) or through writing an erasure code (such as RAID-5 or RAID-6) across multiple storage devices intended to achieve reliability in the face of one or more storage device failures.

As one example of handling interrupted recoveries, consider storage devices utilized in a storage system that is two-drive-failure redundant, such as one that writes N+2 segments of data as RAID-6 style stripes formed as some number, say N, units of data (e.g., shards) and two similarly sized shards storing P and Q parity. Consider further that segments are written out as new data flows into a storage system, with no fixed correspondence of the virtual address of stored data to the physical location of that data, rather than being partially rewritten in place to fixed locations as has been typical of traditional RAID storage systems.

In this example, the content of a storage system may be considered to be committed and recoverable content may be determined after a restart that only had access to the persisted content. However, there may be a problem: the recoverable content depends on the specific set of storage devices that are available and ready at the time recovery starts. If N or N+1 drives out of N+2 drives were written for a particular N+2 stripe prior to the fault that preceded a recovery, then recoverability depends on which drives are available when recovery starts. If N of the drives that were written are available on recovery, then the content of that RAID stripe is recoverable. If N−1 of the drives that were written are available for recovery, then at least some data from that stripe is not recoverable, yet one or two drives that were not written for some stripes might be available during startup, so there are combinations of one or two drive failures that can lose some partially written data and other combinations of one or two drive failures that do not lose the same partially written data.

Continuing with this example, one solution for this problem is to operate at startup, based on whatever data is recoverable, and to ignore any data that is not recoverable. Under normal operation, an incomplete write of all shards of an N+2 stripe should only happen if some in-progress writes did not complete prior to a storage system or storage controller fault, or if a storage device fails resulting in a persistent partial failure. In this way, a storage device failure may be handled by writing the failed shards to new locations prior to considering the write complete, or by somehow persistently marking the device as having failed so that it will not be considered as a viable source for up-to-date content on a storage system or storage controller startup.

To conclude with this example, as soon as a write of a stripe is complete (or as soon as any data is N+2 redundant through one or more techniques), the storage system logic may consider the write to be durable and recoverable and therefore the storage system may move on to some new set of writes that depend on that previous write being guaranteed recoverable. For example, a first write might store data that represents the establishment of a snapshot of a volume, and a second write might represent new data written to that volume after the snapshot. The second write is written within the context of structures established by the first write.

In some embodiments, as an alternative, the snapshot and the write may be concurrent such that the write is included in the snapshot (thus being associated with one version of the durable structures for the volume and its snapshot), or the write could be excluded from the snapshot (thus being associated with another version of the durable structures for the volume and its snapshots), or either the snapshot or the write or both might be backed out as never having happened, which are all consistent and acceptable outcomes if neither the snapshot request nor the write were completed and signaled to a requester as completed.

Continuing with this example, while the snapshot and the write are being processed, the storage system or a controller might fault a first time, and the snapshot—at the time of the first fault—may have been written to N out of N+2 devices, while the write might have been written to M out of M+2 devices. In this example, during recovery, the storage system may take action to clean up or move forward data structures so that the storage system is ready to process new writes. Further, if one or two devices are not available during recovery, then either the snapshot, or the write, or both, or neither might be recoverable without the two unavailable devices. Subsequent first recovery actions may depend on which devices are not available, which may involve writing down new data that is protected by some alternate L+2 data protection scheme on some other set of devices to finalize a clean structure for the volume and its chain of snapshots and of the data that does or does not fall into one or another of the snapshots. In this example, if the writing of the L+2 redundant data is written to only L devices before a second storage system or storage controller fault, then subsequent second recovery of the first recover actions may also depend on which storage devices are available during the second recovery. However, a different two devices may be unavailable during this second recovery, thereby resulting in a different answer for whether the snapshot or the write are recoverable and some independent answer for whether the first recovery action is recoverable. Such a scenario may cause a problem if the first recovery actions determine one answer for whether a snapshot or write are recoverable but the second recovery determines a different answer for whether the snapshot or the write is recoverable. Note that determining that written information is recoverable can be calculated from the available stored data, whereas unrecoverable information may simply be unknown to recovery so that recovery may not explicitly determine that it is unrecoverable. As an example, for a 2+2 RAID-6 stripe, say that only two data shards were written prior to a fault that resulted in a later recovery, then, if only those two shards are available during recovery then the data is recoverable. Otherwise, in this example, if only the P and Q shards are available during recovery, then there is no available knowledge of the stripe at all.

In this example, there may exist the following scenario: the first recovery determines that both the snapshot and the write into the volume are recoverable, but the recovery action must then determine whether the write should be included in the snapshot or excluded from the snapshot. The first recovery actions might then include writing a record that the snapshot exists and has a name and might include metadata changes that include the write content in the snapshot, with a reference to the write content added to a table.

Continuing with this scenario, if during the second recovery, the write of the L+2 data from the first recovery actions is recovered, as is the snapshot, but the write included in the snapshot is not itself recovered, then there may be metadata associated with the snapshot that includes data which is not itself recoverable (and may be entirely unknown given the set of devices available). Such a result may be inconsistent and may corrupt metadata, depending on how the storage system implementations handles this scenario.

Further, during a second recovery, actions may be taken to complete recovered actions by writing further data and metadata based on what was recovered, and a fault might occur during that recovery, resulting in a third recovery based on perhaps a different set of available and unavailable devices.

While it may be that the likelihood of some of these scenarios is low because such scenarios may depend on particular combinations of faults during narrow time windows during the writing of redundant data after just enough data has been written for the data to be recoverable with one or two devices unavailable during recovery—without more data having been written so the data is guaranteed to be recoverable no matter which two devices are subsequently unavailable. In other words, such scenarios may require a sequence of faults and recoveries where each fault happens during one of these narrow time windows, and they require that a different set of one or two devices be unavailable during subsequent recoveries. However, while these scenarios may only occur infrequently, or rarely, these scenarios are possible, and implementations should have strategies to mitigate them.

In some implementations, strategies to prevent such scenarios may include using two-phase commit, where data is written out as a set of pending changes, and once all changes are written, a much smaller commit is written out. However, the commit may have the same problem. In other words, if a storage system is expected to recover with two failed storage devices, then at least three copies of the commit must be written, or it must itself be written using an N+2 redundancy scheme. As an example, if one or two of three copies are written, then one recovery sequence may be aware of the commit, while a second recovery sequence may fail to be aware of the commit, or vice versa. In this example, if the existence of the commit itself is used as a basis for subsequent steps in recovery, and if a second recovery depends for correctness on seeing the same commit (or lack thereof) to ensure that anything written in subsequent steps is handled correctly, then the same issue applies where inconsistency between a first recovery and a second recovery can lead to corruption.

Further, the examples herein may implement any N+R scheme, where R is a number of shards representing redundancy data, where any N valid, written, and available shards (whether data or redundancy shards) may be used to recover content. Further, if at least N shards, but fewer than N+R shards, are written prior to a fault, then if at least N of the written shards are available during recovery, then the associated data is recoverable. However, if fewer than N of the written shards are available during recovery, then some of the content may not be recoverable. Further in this example, if there is a second fault during a first recovery that leads to a second recovery, or an eventual third fault leading to a third recovery, and so on, then a different set of available devices may, as described above, alter the set of written stripes for which a sufficient number of shards are available.

In some implementations of a unified storage element (320), recovery may be based on recording available storage device lists. Such available storage device lists may provide a solution for determining a consistent set of recoverable data across multiple reboots, where the solution may include terminating efforts for a second recovery that detects failed storage devices if that second recovery follows a first recovery with an incompatible, or different, set of detected failed storage devices. Such a recovery protocol may operate in one of two ways: during recovery, before making any other changes that could lead to inconsistencies in subsequent recoveries, an available storage device list is generated that indicates a set of devices that are included in the given recovery sequence. The available storage device list may be written to all available storage devices. Until the available storage device list is written to all available storage devices, and until the writes are successful to a sufficient number of those storage devices that a subsequent detection on recovery is guaranteed, then further recovery is prevented from proceeding.

However, this solution may present a problem: how can a list of available devices be recorded in a way that is reliably recoverable on a second, third, or fourth recovery each with an inconsistent set of available devices? While maintaining such a list may be difficult, this is simpler information than a set of all erasure coded stripes. One example solution, in a storage system that is redundant against R failures, includes writing the list of available devices to at least 2×R+1 storage devices before proceeding further with recovery. In this example, with an R of two (2), a subsequent recovery that is missing a different set of two storage devices will see at least three of those lists of available storage devices. Alternately, if the writing of the list of available storage devices had been written to R storage devices or less, a subsequent recovery might not see the list of available storage devices, or might see only one copy of the list. If a subsequent recovery does not see the list of available storage devices at all, then the previous recovery could not have advanced to making any incompatible changes, and a new list of available storage devices can be expressed to a different set of 2×R+1 storage devices. If a subsequent recovery does not see at least R+1 copies of a list of available storage devices, a prior recovery could not have advanced to the point of making changes and the current list of available devices could be written out. Alternately, if a subsequent recovery sees any copy of the prior list of available storage devices, it could use that list of available storage devices.

Continuing with this solution, regardless of the manner in which the list of available storage devices is made reliable, once a fault during a first recovery has led to analysis for a second recovery, if it is determined that the available storage devices during analysis for the second recovery does not sufficiently overlap with the available storage devices during a first recovery that might have proceeded past the point of writing the list of available storage devices, then recovery is stopped. If a sufficient number of those storage devices do come back online, then the second recovery can proceed after that point, but not before. In other words, in this example, the union of the list of available storage devices from a first recovery and the list of available storage devices from a second recovery cannot be a set larger than R devices.

In some implementations of a unified storage element (320), recovery may be based on identities of allowed stripes. In this example, a solution may be more tolerant of different sets of storage devices being available on subsequent recovery from prior interrupted recoveries. For example, a set of allowed commit identities may be defined to be associated with data that is allowed in the storage system, and a set of disallowed commit identities may be defined to be associated with data that is not allowed in the storage system for one or more reasons.

In this example solution, there may be several types of data, including one or more of: erasure coded stripes, each of which is associated with at least one commit identity, recent commits of commit identities, a set of allowed commit identities, a set of disallowed commit identities, or a set of future commit identities.

Continuing with this example, when writing data into an erasure coded stripe, until that data is written completely, such that it is guaranteed to be recovered by any sufficiently large set of storage devices available during a recovery, a storage controller may not consider the data committed. Such a protocol that delays data as being committed may include waiting until all shards of, say, an N+R stripe are fully written before anything in that N+R stripe can commit. In this case, there may be only one commit identity associated with the stripe, where the commit identity may be stored somewhere in the stripe that should be available during recovery. If parts of a stripe can be made durable and recoverable without making the entire stripe durable and recoverable, as suggested in previous sections, such as by writing sub-regions of shards with matching dual parity, or by mirroring writes to fast memory or by writing partial M+R shards of an N+R stripe (or any of the other techniques described previously), then commit identities may be associated with those partial elements of a stripe, but then the rest of this argument applies to that partial stripe which must still be completely persisted before proceeding to committing that partial stripe.

Further in this example, before any such written data may be relied upon (before it is considered recoverable, durable content of the storage system), the commit identities associated with the written data must be written down to ensure they will end up in the set of allowed commit identities. The set of allowed commit identities may be written into headers for subsequent shards, or the set of allowed commit identities may be written into fast storage on storage devices. In other cases, with regard to the storage devices above, the sets of allowed or disallowed commit identities may be stored in memory mapped durable storage on storage devices, or written to durable registers on storage devices. Writing the sets of allowed or disallowed commit identities into headers for subsequent shards may depend on waiting for sufficient new data to trigger that new data being persisted into new shards. In some examples, writing commit identities directly into fast memory, or memory mapped durable storage, or durable registers may be done quickly, allowing written data to be considered durably recoverable more quickly.

For data to be considered reliably committed, such that the storage system implementation may continue operating in reliance upon the data having been reliably committed, associated commit identities for the data considered reliably committed must be written to at least R+1 storage devices, though commit identities could be written to more devices than R+1 before proceeding.

In some implementations, recovery of recently written data may be based upon identifying commit identities for the data being recovered, and upon determining whether those commit identities were written out as committed. In this example, if the identified commit identities are determined to be committed, then the data has been written completely and may be safely considered to have been committed. In other words, if the identified commit identities are determined to be committed, then the data may be recoverable regardless of which R or fewer subsets of an N+R stripe are not available. To ensure that a subsequent recovery will also see the commit identities as committed (possibly using a different subset of available storage devices), recovered commits of commit identities should be written down again, if they had not already been written to a sufficient number of storage devices to ensure they are recoverable.

In some examples, a situation may arise where a recovery is unable to identify the commit records for a set of commit identities. In one example solution, during a given recovery process, if the given recovery process determines the list of commit identities whose commits the given recovery process did not find, then that list of commit identities may be written into a disallowed list, where the disallowed list explicitly removes a commit identity from being considered valid content for the storage system, or where the disallowed list stores an indication that the commit identity is invalid. More specifically, a recovery process may generate two lists: (a) the allowed list that represents the set of all commit identities which represent valid content for the storage system, and (b) the disallowed list that represents a set of commit identities that specifically do not represent valid content for the storage system. Once both the allowed list and the disallowed list have been determined, the allowed list and the disallowed list may be written out as new data, in some cases represented by a set of new commit identities and committed by writing those new commit identities to a sufficient number of storage devices.

Continuing with this example, one solution to determine the set of commit identities to add to the disallowed set is to determine which commit identities exist in written data but that lack persisted commits of those commit identities found during recovery. Another example solution to determine the set of missing commit identities is to establish, during operation of the storage system, a set of allowed future commit identities, and to make the set of allowed future commit identities durable before any of those commit identities can be used for writing new data. This results in three lists: (a) allowed commit identities, (b) disallowed commit identities, and (c) potential future commit identities. All three lists can be written together or separately, where the three lists may be associated with commit identities for the writes that persist the lists, and committed by writing commit records for those commit identities to a sufficient number of storage devices. In some examples, determining commit identities to add into the disallowed list during recovery may include reading the last committed future commit identities list (where the committed future commit identities list may depend upon finding the last such list for which a commit record could be recovered), determining the subset of the committed future commit identities list for which no commit record was found, and then adding that subset to the list of disallowed commit identities.

In this example, the lists of allowed, disallowed, and future commit identities can be simplified by making commit identities sequential. During normal operation that does not include faults and corresponding recoveries, the future commit identities list may be described as, or may indicate, a range of numbers from some already used and fully committed number to some future number that has not yet been fully committed. At storage system or storage controller startup or after a recovery, the start of that range of numbers may be set to some value that must be past any commit identity that might have been missed due to an unavailable storage device. Before the sequence numbers within the range have all been used, a new range may be written, where the process of writing the new range may use and commit at least one commit identity-consequently, the new range should be written out prior to using the last sequence number within the current range. Further, as data is written, committed, and the data commits are added to the allowed list, the beginning of the range may be advanced to a commit identity prior to any still in progress write and commit.

Continuing with this example, the use of ranges of sequential identifiers may also simplify the allowed and disallowed lists. For example, during recovery, any commit identity not already on the disallowed list that precedes the first number on the future commit identity range may be considered allowed—unless the commit identity was already disallowed such as in a previous incomplete recovery. Further, even if one of those commit identities had never been used, the commit identity could not have been associated with partially written and committed data, which creates opportunities for compacting allowed and disallowed lists into a set of ranges. In this example, the set of commit identities between the start of the future commit identities range and one prior to the first number in the range for which a commit record of a commit identity is found is disallowed, creating one range. Further, the set of commit identities between one after the last number in the future commit identity range for which a commit record of a commit identity is found and the last number in the future commit identity range itself is also disallowed, thereby creating another range. In some cases, other commit identities in the future commit identity range may produce a messier set which may include individual commit identities that are allowed or disallowed, or potentially compressible sub-ranges where all commit identities in a range are allowed or disallowed.

To complete this example, an additional step or consideration for using ranges may be to track instances of encountering an error while writing out data prior to the data being committed. For example, if an erasure coded partial or complete stripe cannot be written out completely due, for example, to an erase block or storage device failure, then the content may be rewritten to new partial or complete stripes on a new set of devices. In this case, the first failed attempt at writing the data should be invalidated, and this invalidation may be done by adding any commit identities associated with the failed writes to the disallowed list. Otherwise, the simple range model described in the previous paragraph may fail to disallow the incomplete data on a recovery and might add the data to the allowed list.

In some implementations of a unified storage element (320), the data and recovery models may be implemented without use of multiple addressable storage classes—where some storage class activity may be performed invisibly by the storage system. However, given that a unified storage element (320) may include fast durable storage and bulk durable storage, providing multiple addressable storage classes may provide a good basis for speeding up data storage and system recovery, and a good basis for making data storage and system recovery work better with flash storage than it would without multiple addressable storage classes. Examples are provided below.

As one example, as mentioned previously, commit identities may be committed by writing them to memory mapped durable storage, fast durable storage, or durable registers on a sufficient number of storage devices. Additionally, transferring data for a partial or complete stripe to fast durable storage may allow a staging of data to a storage device before it is transferred to bulk storage, where operation of that bulk storage might rely on restricted modes of operation to get the best performance or the longest storage device lifespan. Further, allowed, disallowed, and future commit identities, as discussed above, particularly future commit identities, may be implemented by writing these different types of identity data to fast durable storage. Particularly, in some cases, a range of future commit identities may be written as two numbers, and possibly stored in durable mapped storage or durable registers, thereby allowing any identity within a range (of perhaps a few hundred potential commit identities) to be used, and allowing the future range to be extended or moved by writing down one or two numbers to alter the beginning or end of the range.

As another example, reorganizing or reformatting of data stored in fast durable storage as it is transferred to bulk storage may not require additional commit phases because the data may, with high probability, already be guaranteed to be on a sufficient number of storage devices before a storage controller instructs it to reorganize or reformat the data during transfer.

As another example, models of mirroring content to multiple storage devices prior to converting it to, say, a RAID-6 format, or models of writing M+R content prior to transforming it into N+R content may need to associate commit identities with M+R content. In this example, for any other partial committable write of a complete erasure coded stripe to commit, it will have at least one commit identity associated with the content so that it can operate through the commit algorithm. Further, the recording of a commit identity could itself be written as a subsequent partial committable write even to the same erasure coded stripe.

In some implementations of a unified storage element (320), the features of a unified storage element (320) may be applied to various redundancy models. Further, storage devices may also have internal redundancy, or storage controllers may store redundant data within storage devices to handle localized failures of individual blocks, erase blocks, or chips. Most of the following examples consider storage devices that fail completely, or that do not power up and make themselves available in a timely fashion. However, in some cases, some data in, say, an N+R stripe might be unavailable due to a failed or corrupted read within an otherwise operating and available storage device. Further, internal redundancy may reduce the number of cases where this becomes a problem, to the point that it is statistically implausible, but internal redundancy may also fail, and some storage devices may not deploy enough of it to recover from all non-catastrophic failure modes.

Continuing with this example, handling such failures may be solved by an implementation that avoids coming online if exactly R devices do not boot properly, and the implementation may instead wait to come online until the number of unavailable storage devices drops to R−1 or fewer. Alternately, an implementation might determine the recoverability of all data that might have been in flight at the time of the fault that preceded recovery, and then ensure that none of the data encountered an unrecoverable error before proceeding to making changes that might affect subsequent recoveries. As an alternative, if a latent corruption is encountered in a block for which at least one additional (but not currently available) redundancy shard might have been written, the storage system may pause or fault waiting to determine if a storage device for that redundant shard eventually comes back online.

Further, note that storage systems may use various schemes for different data. For example, some data may be written as two mirrored copies that are safe from one failure, other data might be written in a RAID-5 style N+1 scheme, and other data might be written in a RAID-6 style N+2 scheme, or even using three or four mirrored copies or using N+3 schemes for triple failure redundancy (perhaps for critical but low-volume metadata). Further, different data might be striped or mirrored across different subsets of devices, where some subsets may overlap in various ways and other subsets might not. Any statements about the interrelation between complete, recoverable, incomplete, and unrecoverable data should then consider the completion and recoverability model associated with each type of data, so for example if content of a RAID-6 stripe follows and depends on a supposedly completed RAID-5 or two-mirrored-copy write, then the RAID-6 stripe's dual-failure-redundant validity during recovery may depend on the recoverability of single-failure-redundant content, regardless of how the set of storage devices for each written dataset do or do not overlap.

Further, storage systems may divide up storage devices such that redundancy operates within constrained groups of devices (possibly organized around natural divisions such as enclosures or internal networks and busses). Such constrained groups of devices may be called pools, or write groups, or RAID groups, or referred to by other names. In this example, such a constrained group of devices is referred to as a write group, where a principle behind a write groups is that any N+R stripe that utilizes any storage device within the write group will only store shards on other storage devices in the same write group. For example, if there are 12 storage devices in write group A and 12 storage devices in write group B, then any pairing of data and redundancy will be constrained within either the 12 storage devices in write group A or the 12 storage devices in write group B. In some cases, write groups for a storage system may be different sizes and not uniform sizes. Further, as storage is added, write groups may be extended to include more storage devices, or additional write groups may be added to the storage system. In some cases, incremental addition of storage devices may cause making a choice between making existing write groups too large or making a new write group that is too small—in such a case, the storage system may split existing write groups and transform existing content to match the new write group layouts. These constraints may limit damage caused by failure of devices by limiting the intersections of failed devices across all stripes. As an illustrative example: if two devices failed in write group A and one device failed in write group B, no N+2 stripe could encounter all three failed devices while writing out stripes or during recovery because any stripe stored in write group A which might include write group A's two failed devices will not include the failed storage device in write group B, and no stripe in write group B which might include write group B's one failed device will not include either of the two failed storage devices in write group A.

To complete this example, in a storage system that implements write groups or some similar constraint in allocating shards of redundant data, previous discussions concerning numbers of failed storage devices that allow continued operation or a successful recovery should apply those rules to such individual groups of storage devices, rather than to the entire storage system.

In some additional implementations, erasure coding of staged data to fast durable storage and to bulk storage may be performed within a storage system. For example, consider a storage system with two or more controllers, where each controller is connected to a plurality of storage devices, where multiples ones of the storage devices are connected to one or more of the storage controllers, and where at least some of storage devices include both (1) addressable fast durable storage that supports a high transfer rate or a predictable low latency or a high and sustained overwrite rate or a combination of such properties, and (2) addressable bulk storage that may be substantially larger than the addressable fast durable storage or may not support high overwrite rates without degradation of storage lifespan or might have worse or less predictable latency or some combination of these properties. In this example, each type of storage is addressable and separately accessible for at least read and write from each of their connected storage controllers, and where the storage devices may further support commands issued from connected storage controllers to transfer content to other storage devices possibly from the addressable fast durable storage and possibly from the addressable bulk storage, or may further support commands to transfer specific content from fast durable storage to bulk storage, possibly with some transformations to format or calculated erasure codes.

In some implementations, some functions of a storage device or of a storage controller may be combined or co-resident on unified elements (i.e., removable elements or circuit boards) of a storage system, where one or more of the storage controller functions on one such element may communicate as described herein, and where storage device functions may be implemented on separate such elements.

For example, a storage controller may persist state associated with operations that should be persisted quickly, where that persisted state is at least the minimum needed to ensure recoverability of the operation in cases of faults due to software, hardware, or power loss, to fast addressable storage across multiple storage devices to ensure reliability against faults, and where the persisted state is written as a dynamically allocated erasure coded stripe or simple mirrored replicas, in patterns that allow recovery in the face of faults in up to $R_1$ storage devices. In this example, the operation may be completed to bulk storage by writing whatever content remains after deduplication, compression, or other possibly invalidating operations (for example overwrites, deletions, unmaps/trim calls, virtual copy operations) to an erasure coded stripe formed across the bulk storage of multiple storage devices, where the erasure coded stripe allows recovery in the face of faults in up to $R_2$ storage devices.

In this example, $R_1$ and $R_2$ may be the same. For example, if a RAID-6 scheme involving P and Q parity shards according to typical RAID-6 models of erasure coding is used for storing both fast write content to fast durable storage and longer-duration content to bulk storage, $R_1$ and $R_2$ might both be 2. Likewise, with a RAID-5 scheme, both $R_1$ and $R_2$ might be 1. Other schemes such as those involving Galois fields can support $R_1$ and/or $R_2$ of 3 or more. The data shards associated with content written to fast durable storage might be one number, say M, such that writes of fast content comprise $M+R_1$ stripes written to dynamically allocated shards across addressable fast durable storage of $M+R_1$ storage devices, while data shards associated with content written to bulk storage might be another number, say N (which may be the same or different number as M) such that writes of longer-duration content comprise $N+R_2$ stripes written to shards across addressable bulk storage of $N+R_2$ storage devices.

In some implementations, the writing of content to either fast durable storage or bulk durable storage need not be written as uniform-width erasure coded stripes. For example, some data written to fast durable storage might be written as $M_1+R_1$ while other data might be written as $M_2+R_1$ where $M_1 \neq M_2$. Similar variations might apply to data written to bulk storage. Further, if less than a full stripe's worth of data is available to be written, fewer shards (or subregions of complete shards) might be written, together with intermediate calculated redundancy content (e.g., P or P and Q shards for RAID-5 or RAID-6) calculated from the data so far available. As further data is ready to be stored, additional shards (or additional subregions of complete shards) might be written together with updated redundancy content. Further in this example, partially written content to bulk storage might result in matching intermediate redundancy content being written first to addressable fast durable storage (separately from any redundancy scheme associated purely with writes of data content to fast durable storage) with a final version of redundancy content written to bulk storage as completed shards of redundancy when complete corresponding data shards have been fully written.

In some implementations, if content written to fast durable storage is sufficiently similar to content to be written to bulk storage, then one or more storage controllers may utilize capabilities of storage devices such that the content to be stored in the addressable bulk storage for a specific storage device is first directed to fast durable storage on the same storage device (or alternately, content stored in fast durable storage is eventually stored into bulk storage on the same storage device), and then transferred (perhaps with some reformatting) from fast durable storage to bulk durable storage directly by the storage device, under direction from operations running on the one or more storage controllers (using the previously described commands to transfer and possibly reformat content).

In some implementations, if content written to fast durable storage is similar to content that is written to bulk storage on a separate storage device, then if the storage devices and interconnect support it, and a command is available to do so, and there is efficiency to be gained in doing so (such as due to relative availability of interconnect bandwidth), one or more storage controllers may direct storage devices to transfer (and possibly reformat) content between the fast durable storage on a first, source storage device and the bulk storage of a second, target storage device.

In some example implementations, it may be possible for data to transfer between a first storage device and a second storage device such that the transferred data coupled with data already present on the second storage device (such as in either fast durable storage and bulk storage or possibly transferred from a third or further additional storage devices) can be used to calculate new data to be stored, such as combining partial data into combined formatted data, or such as calculating content for redundancy data shards from prior intermediate content for redundancy data shards coupled with different intermediate content for the redundancy data shards or content from data shards. For example, with a simple XOR parity-based redundancy shard, a first partial parity calculated by XOR'ing data from a first subset of data shards and a second partial parity calculated by XOR'ing data from a second subset of data shards can be transferred from a first storage device which calculated the first partial parity and from a second storage device which calculated the second partial parity to a third storage device which can then XOR the first and second partial parties together to yield a complete calculated parity which can be stored into bulk durable storage within the third storage device.

Further, in some implementations, Galois field math allows similar partial results to be merged together to store additional types of calculated redundancy shards, such as the typical Q shard for a RAID-6 stripe. For example, with the Galois math described in the paper "The mathematics of RAID-6" by H. Peter Anvin, 20 Jan. 2004, consider that the final Q shard for a 5+2 RAID-6 stripe is calculated as:

$$Q = g^0 \cdot D_0 + g^1 \cdot D_1 + g^2 \cdot D_2 + g^3 \cdot D_3 + g^4 \cdot D_4$$

In this example, a calculation of a partial Q from just the first two data shards could be calculated as:

$$Q_{p1} = g^0 \cdot D_0 + g^1 \cdot D_1$$

In this example, $Q_{p1}$ may be stored by a storage controller on some first partial Q shard storage device as part of protecting just the first two data shards for the eventual end resulting 5+2 stripe, and this plus an additional XOR parity stored in yet another storage device is enough to recover from any two faults of the devices written for this partial stripe, since as long as the partial stripe is properly recognized as partial, the content from $g^2 \cdot D_2 + g^3 \cdot D_3 + g^4 \cdot D_4$ can be inferred to be calculated from empty (zero) data shards $D_2$, $D_3$, and $D_4$.

Continuing with this example, a second calculation of a partial Q from the other three data shards could further be calculated as:

$$Q_{p2} = g^2 \cdot D_2 + g^3 \cdot D_3 + g^4 \cdot D_4$$

In this example, $Q_{p2}$ may be stored on a second partial Q shard storage device as part of protecting those three data shards, and as with the first partial Q shard, when coupled with an additionally written partial XOR parity written to another storage device, the partial content is again protected from any two faults since the content from $g^0 \cdot D_0 + g^1 \cdot D_1$ associated with the partial Q shard can again be inferred to be calculated from empty (zero) data shards $D_0$ and $D_1$.

Continuing with this example, a storage device which eventually received both $Q_{p1}$ and $Q_{p2}$ may calculate the Q value for the complete stripe including all five data shards as an appropriate Galois field addition of $Q_{p1}$ and $Q_{p2}$.

In some implementations of a unified storage element (320), the features of a unified storage element (320) may be applied to implement data redundancy using commit identities, as described above, and as additionally described as follows. For example, given a storage system of the form described above, but where some or all storage devices (or the storage device aspect of combined storage elements) may or may not have separately addressable fast durable storage and bulk durable storage, or where storage devices may or may not further support the recording of numbers in durable mapped memory or addressable durable registers, various schemes may be used that are based at least in part on commit identities as described above to ensure corruption-free sequences of storage system and storage device faults and recoveries which are themselves interrupted by faults where subsequent recoveries are subject to inconsistent sets of available, slow to become available, or faulted storage devices.

In these examples using commit identities, one consequence is to ensure that within the context of a storage system based on a redundancy level of $R_c$ for all written content, incompletely written erasure coded stripes do not result in inconsistent actions taken by subsequent recoveries in such a sequence of faults, recoveries and unavailable storage devices. As one example, with a scheme that relies on three lists of commit identities, which may be efficiently represented as ranges of numeric commit identities, which represent and correspond to: allowed (verified as durably committed) content, disallowed content, and potential content that should be verified during a recovery. In this example, these three lists are content that is written to fast durable storage, bulk durable storage, durable persistent mapped memory, durable registers, or various combinations of these types of memory by using mirroring or erasure coding with a redundancy level sufficient to handle $R_{id}$ faults, which generally matches the requirements for storage device fault handling for the storage device itself. However, in other examples, different content may use different levels of redundancy (for example, key metadata may be written with higher redundancy than bulk data, or transactional content or fast write content may be written to a smaller number of devices that are distinct from devices used for bulk storage). In general, $R_{id}$ should be no less than the highest $R_c$ value associated with any other storage system content. However, in some examples, it is also possible that segregated storage devices will be used to record some or all updates to lists of commit identities, where the segregated storage devices (e.g., specialized NVRAM devices) operate with a reduced redundancy level.

In some embodiments, storage system content (generally including commit identity lists, though in some cases these commit identity lists may be an exception, particularly with durable registers that record ranges) is written to storage devices with associated commit identities, generally in line with the content itself (such as being written within shards, pages, or segments that also store data or metadata that represents the durable content stored by the storage system). In some examples, written content may be associated with a commit identity that is in the potential content list, where once completely written with the required level of redundancy across storage devices (e.g., $N+R_c$ for typical content, or $R_{id}+1$-way mirrored or $N_{id}+R_{id}$ erasure coded for content storing lists), the associated commit identities may be added to the allowed list, where the allowed list may be written out. In this example, after the allowed list update that includes a commit identity has been completely written across storage devices with a corresponding redundancy, the storage system may be assured to be recoverable by any subsequent recovery. Further in this example, if there is an issue in writing content (such as due to a storage device fault while it is being written), either matching content may be written to an alternate device or the commit identity associated with the content may be added to the disallowed list and written out and the entire update can be performed again as a fresh update to new locations and with new commit identities. However, in some examples, even though the writing of an allowed or disallowed list may itself utilize commit identities from the pending list for the writing of the list itself, and even though general content writes depend on associated commit identities being added to the allowed list and written out, after an allowed list is written out with required redundancy, the associated content is committed without the allowed list update being further committed with an additional update to the allowed list (otherwise, there may be an infinite progression in order to commit data).

In some implementations, during recovery, storage system content may be scanned to reconstruct the allowed commit identity list, the disallowed commit identity list, and the potential commit identity list. Entries added to the potential commit identity list may be confirmed by determining whether the potential commit identity list update was committed, which can be based on the use of a previously committed and confirmed entry in the potential commit identity list. In this example, a commit identity in the recovered potential commit identity list may be tested for whether it may have been associated with an addition to the allowed list. Further in this example, even a partial update adding an identity to the allowed list should exist only if the associated content had been completely written and completed as a fully redundant mirrored or erasure coded stripe, so it is safe to conclude that such a commit identity may be safely recovered into the allowed list even if it was only partially written out with the required redundancy. However, in this example, an identity in the recovered potential commit identity list for which there is no verifiable entry added to the allowed list, even as a partially written update (or possibly in the case of an update which was clearly only partially written), can be added to the disallowed commit identity list. In this example, to handle the case of one recovery failing to find a partially written allowed commit identity and a subsequent recovery that does find the partially written allowed commit, the second recovery may use the existence of the commit identity in the disallowed list to overrule the addition of the commit identity to the confirmed allowed list.

In some implementations, as part of a recovery that depends on the use of confirmed written data, the potential commit identity list should be resolved into a list of committed identities because they showed up in an at least partially written allowed list update, with all other potential commit identities (including any potential commit identities that might possibly have been partially written) resolved into the disallowed list. Further, in this example, prior to a recovery process acting on the results of any such content, the allowed and disallowed list updates should be written out and committed. In this example, at this point, any written content associated with a commit identity may be determined to have been allowed (it was fully written and committed) or to be disallowed (it may or may not have been fully written, but it had not been successfully and completely committed and was backed out before that had completed). Further, in this example, a partially written update to an allowed list may end up disallowed in a sequence of recoveries and faults, where in such a case, such an update to the allowed list ends up being discarded because the update is not allowed. In this way, in this example, sequences of faults and recoveries may prevent missing updates in one recovery from infecting a subsequent recovery that observes the update.

In some implementations, during the normal running of a storage system, it is possible that writes of erasure coded content may not complete successfully due to, for example, a fault affecting writes or in receiving status for a write completion. In such cases, entries may be added to a disallowed list to effectively negate the associated written content (by disallowing its related commit identity).

In some implementations, during normal operation, updates to lists of commit identities may be persisted by writing into successive updates that follow the content that the commit identity is intended to commit. In some examples, alternately, or additionally, some updates to lists of commit identities, or some additions of ranges of identities to the potential commit identity list or to the allowed commit identity list, may be written to durable registers or to durable memory interfaces on supported storage devices. In some examples, support for up to R device faults can be supported either by writing an M+R erasure code containing these list updates, or by storing R+1 copies of the list updates (or ranges) on R+1 separate supported storage devices. An R+1 scheme is particularly suitable with durable registers or durable memory.

For further explanation, FIG. 4 sets forth a flow chart illustrating an example method for performing data storage operations on a storage element integrating fast durable storage and bulk durable storage according to some embodiments of the present disclosure. Although depicted in less detail, the unified storage element (320) may be similar to the storage systems described above with reference to FIGS. 1A-1D, FIGS. 2A-2G, FIGS. 3A-3C, or any combination thereof. In fact, the storage element, such as unified storage element (320) may include the same, fewer, additional components as the storage systems described above.

As described above, a unified storage element (320) integrates fast durable storage (454) and bulk durable storage (456). In this example, the unified storage element (320) receives a data storage operation (452), such as a read or write operation or some other data storage operation, and determines how to make use of either the fast durable storage (454), or bulk durable storage (456), or both the fast durable storage (454) and bulk durable storage (456) in performing, or carrying out, the data storage operation (452). As described above, a data storage operation (452) may allow a host computer to make explicit use of all memory types within the unified storage element (320), or in some cases, the unified storage element (320) may provide data storage features without revealing specific aspects of the underlying memory types. Examples implementations of fast durable storage (454) and bulk durable storage (456), and various techniques for providing or hiding features, are described above with reference to the description of the memory architecture of a unified storage element (320).

The example method depicted in FIG. 4 includes receiving (402), at a storage element integrating fast durable storage (454) and bulk durable storage (456), a data storage operation (452) from a host computer (450), where the data storage operation (452) may be a read command, a write command, an erase command, or generally, any type of command or operation that utilizes one or more features that the unified storage element (320) provides. In this example, the storage element may be a unified storage element (320), and a host computer (450) may be a remote computing device such as a remote desktop, a mobile device, a virtual machine within a cloud computing environment, or some other type of computing device or instance executing either locally within a storage system or at a geographically remote location. Receiving (402), at the storage element integrating fast durable storage (454) and bulk durable storage (456), the data storage operation (452) may be implemented by the unified storage element (320) receiving a message at a communication port connected to a storage area network (158), a local communication interconnect (173), or a local area network (160), such as depicted in FIG. 1A, in accordance with one or more network communication protocols.

The example method depicted in FIG. 4 also includes storing (404) data (460) corresponding to the data storage operation (452) within fast durable storage (454) in accordance with a first data resiliency technique. Storing (404) data (460) corresponding to the data storage operation (452) within fast durable storage (454) in accordance with a first data resiliency technique may be implemented by one or more controllers of the unified storage element (320) storing the data (460) as part of a RAID stripe within a RAID N+2 schema, as described above with regard to storing data within a unified storage element (320).

The example method depicted in FIG. 4 also includes, responsive to detecting a condition for transferring data (460) between fast durable storage (454) and bulk durable storage (456), transferring (406) the data (460) from fast durable storage (454) to bulk durable storage (456) in accordance with a second data resiliency technique. Detecting a condition for transferring data between fast durable storage (454) and bulk durable storage (456) may be implemented using different techniques. In one example technique, the condition for transferring data may be successful completion of writing one or more entire RAID stripe and calculating a corresponding parity value. Transferring (406) the data (460) from fast durable storage (454) to be stored as data (462) within bulk durable storage (456) in accordance with a second data resiliency technique may be implemented by one or more controllers of the unified storage element (320) moving or copying the data (460) in the fast durable storage (454) into bulk durable storage (456) as part of a RAID stripe within a RAID M+2 schema in bulk durable storage (456), as described above with regard to storing data within a unified storage element (320)—where the RAID N+2 schema used for fast durable storage (454) is different from the RAID M+2 schema used for bulk durable storage (456).

For further explanation, FIG. 5 sets forth a flow chart illustrating an example method for staging data within a unified storage element (320) according to some embodiments of the present disclosure. The example method depicted in FIG. 5 is similar to the example method depicted in FIG. 4, as the example method depicted in FIG. 5 also includes: receiving (402), at a storage element integrating fast durable storage (454) and bulk durable storage (456), a data storage operation (452) from a host computer (450); storing (404) data (460) corresponding to the data storage operation (452) within fast durable storage (454) in accordance with a first data resiliency technique; responsive to detecting a condition for transferring data between fast durable storage (454) and bulk durable storage (456), transferring (406) the data (460) from fast durable storage (454) to bulk durable storage (456) in accordance with a second data resiliency technique.

However, the example method depicted in FIG. 5 differs from the example method depicted in FIG. 4 in that FIG. 5 also includes determining (502) a data storage optimization that is applicable to one or more portions of stored data within the fast durable storage (454); modifying (504) the one or more portions of stored data within the fast durable storage (454) to generate modified data (550); and storing (506), after modifying the one or more portions of data, the modified data (550) within fast durable storage (454).

Determining (502) a data storage optimization that is applicable to one or more portions of stored data within the fast durable storage (454) may be implemented by one or more controllers of the unified storage element (320), where the data storage optimization may be data compression, data deduplication, garbage collection, or some other data storage optimization that results in a smaller storage footprint than the original data, or that results in modified data that may provide efficiencies other than storage size reductions—as described in greater detail above with regard to data storage optimizations applicable to data stored in fast durable storage of a unified storage element (320).

Modifying (504) the one or more portions of stored data within the fast durable storage (454) may be implemented depending on the data storage optimization determined (502) above, where if the data storage optimization is one or more data compression techniques, then the compressed data may be the modified data (550). Similarly, if the data storage optimization determined (502) above is garbage collection, then the modified data may be the originally stored data minus, or without the one or more portions that have been identified for garbage collection, so the modified data (550) is the remaining data after garbage collection. Similarly for the case where the data storage optimization is data deduplication or some other data storage optimization.

Storing (506), after modifying (504) the one or more portions of data, the modified data (550) within the bulk durable storage (456) may be implemented by one or more controllers of the unified storage element (320) writing the modified data (550)—generated by performing the data storage optimizations—into fast durable storage (454).

For further explanation, FIG. 6 sets forth a flow chart illustrating an example method for staging data within a unified storage element (320) according to some embodiments of the present disclosure. The example method depicted in FIG. 6 is similar to the example method depicted in FIG. 5, as the example method depicted in FIG. 6 also includes: receiving (402), at a storage element integrating fast durable storage (454) and bulk durable storage (456), a data storage operation (452) from a host computer (450); storing (404) data (460) corresponding to the data storage operation (452) within fast durable storage (454) in accordance with a first data resiliency technique; responsive to detecting a condition for transferring data between fast durable storage (454) and bulk durable storage (456), transferring (406) the data (460) from fast durable storage (454) to bulk durable storage (456) in accordance with a second data resiliency technique; determining (502) a data storage optimization that is applicable to one or more portions of stored data within the fast durable storage (454); modifying (504) the one or more portions of stored data within the fast durable storage (454) to generate modified data (550).

However, the example method depicted in FIG. 6 differs from the example method depicted in FIG. 5 in that FIG. 6 also includes storing (602), after modifying (504) the one or more portions of data, the modified data (550) within the bulk durable storage (456). Storing (602), after modifying (504) the one or more portions of data, the modified data (550) within the bulk durable storage (456) may be implemented by one or more controllers of the unified storage element (320) writing the modified data (550)—generated by performing the data storage optimizations—into bulk durable storage (456).

For further explanation, FIG. 7 sets forth a flow chart illustrating an example method for staging data within a unified storage element (320) according to some embodiments of the present disclosure. The example method depicted in FIG. 7 is similar to the example method depicted in FIG. 4, as the example method depicted in FIG. 7 also includes: receiving (402), at a storage element integrating fast durable storage (454) and bulk durable storage (456), a data storage operation (452) from a host computer (450); storing (404) data (460) corresponding to the data storage operation (452) within fast durable storage (454) in accordance with a first data resiliency technique; responsive to detecting a condition for transferring data between fast durable storage (454) and bulk durable storage (456), transferring (406) the data (460) from fast durable storage (454) to bulk durable storage (456) in accordance with a second data resiliency technique.

However, the example method depicted in FIG. 7 differs from the example method depicted in FIG. 4 in that FIG. 7 also includes determining (702), based on received write operations and corresponding data payload sizes over a window of time, a data storage consumption rate; and dynamically transferring (704), from the fast durable storage (454) to the bulk durable storage (456) and in dependence upon the data storage consumption rate and storage availability of the fast durable storage (454), one or more portions of stored data at a transfer rate that avoids stalling subsequently received data storage operations.

Determining (702), based on received write operations and corresponding data payload sizes over a window of time, a data storage consumption rate may be implemented by one or more controllers of the unified storage element (320) tracking and recording, for each write operation received over a given period of time, for example, a defined number of seconds or minutes, data payload sizes for the data written into the fast durable storage (454). Further, given an aggregate, or sum of all data payload sizes over the defined window of time, the one or more controllers may calculate a rate at which storage in the fast durable storage (454) is consumed, where the data storage consumption rate may be calculated as quantity of space consumed over the period of time, where the quantity of space consumed is the aggregate calculation, and the period of time is the defined window of time.

Dynamically transferring (704), from the fast durable storage (454) to the bulk durable storage (456) and in dependence upon the data storage consumption rate and storage availability of the fast durable storage (454), one or more portions of stored data at a transfer rate that avoids stalling subsequently received data storage operations may be implemented by one or more controllers of the unified storage element (320) calculating, based on a quantity of memory already being used and a quantity of storage available, an amount of time at which—given the data consumption rate—there is no free space on the fast durable storage (454) available. Further, the implementation may include using the calculated time at which there will no longer be space available (or no longer space available for an average sized write operation payload) and transferring data from fast durable storage (454) into bulk durable storage (456) before the free space in fast durable storage (454) is consumed, which prevents the unified storage element (320) from stalling while data is moved out of fast durable storage (454) because there was insufficient free space.

Example embodiments are described largely in the context of a fully functional computer system for synchronizing metadata among storage systems synchronously replicating a dataset. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety of ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   receiving, in a storage system at a unified storage element that integrates both fast durable storage and bulk durable storage, a data storage operation from a host computer;
   storing, in accordance with a first data resiliency technique that corresponds to a RAID N+2 format, data corresponding to the data storage operation within the fast durable storage of the unified storage element;
   determining, based on the received data storage operation, that a complete RAID stripe has been written to the fast durable storage of the unified storage element; and
   responsive to the determination that the complete RAID stripe has been written to the fast durable storage, moving a portion of the stored data from the fast durable storage to the bulk durable storage of the unified storage element, the bulk durable storage storing the data in accordance with a second data resiliency technique that corresponds to a RAID M+2 format, wherein M is different from N.

2. The method of claim 1, wherein the data storage operation is a write operation, wherein performing the write operation comprises storing data in fast durable storage using the first data resiliency technique, wherein the first data resiliency technique includes use of a RAID N+2 format, and wherein moving the portion of data comprises storing the data in bulk durable storage using the second data resiliency technique, wherein the second data resiliency technique is different from the first data resiliency technique and includes use of a RAID M+2 format.

3. The method of claim 2, wherein RAID parity calculations are a merger of parity calculations for multiple partial erasure coded parity calculations within a Galois field for partially filled data stripe updates, and wherein M is less than N.

4. The method of claim 1, further comprising:
   determining a data storage optimization that is applicable to one or more portions of stored data within the fast durable storage, wherein the data storage optimization includes performing data deduplication;
   modifying the one or more portions of stored data within the fast durable storage to generate modified data; and
   storing, after modifying the one or more portions of data, the modified data within the fast durable storage.

5. The method of claim 4, further comprising:
   storing, after modifying the one or more portions of data, the modified data within the bulk durable storage.

6. The method of claim 4, wherein the data storage optimization is one or more of: data compression or garbage collection.

7. An apparatus comprising a computer processor, a computer memory operatively coupled to the computer processor, the computer memory having disposed within it computer program instructions that, when executed by the computer processor, cause the apparatus to carry out the steps of:
   receiving, in a storage system at a unified storage element that integrates both fast durable storage and bulk durable storage, a data storage operation from a host computer;
   storing, in accordance with a first data resiliency technique that corresponds to a RAID N+2 format, data corresponding to the data storage operation within the fast durable storage of the unified storage element;
   determining, based on the received data storage operation, that a complete RAID stripe has been written to the fast durable storage of the unified storage element; and
   responsive to the determination that the complete RAID stripe has been written to the fast durable storage, moving a portion of the stored data from the fast durable storage to the bulk durable storage of the unified storage element, the bulk durable storage storing the data in accordance with a second data resiliency technique that corresponds to a RAID M+2 format, wherein M is different from N.

8. The apparatus of claim 7, wherein the fast durable storage comprises nonvolatile random access memory.

9. The apparatus of claim 7, wherein the bulk durable storage comprises one or more solid state drives.

10. The apparatus of claim 7, wherein the storage element further comprises volatile random access memory, and wherein one or more controllers are further configured to, in response to a loss of power to the storage element and in dependence upon energy provided by a stored energy device, transfer data from the volatile random access memory into one or more of the fast durable storage or the bulk durable storage.

11. The apparatus of claim 7, wherein the computer program instructions that, when executed by the computer processor, cause the apparatus to carry out the steps of:
storing, after modifying the one or more portions of data, the modified data within the fast durable storage.

12. The apparatus of claim 7, wherein the computer program instructions that, when executed by the computer processor, cause the apparatus to carry out the steps of:
determining a data storage optimization that is applicable to one or more portions of stored data within the fast durable storage, wherein the data storage optimization includes performing data deduplication;
modifying the one or more portions of stored data within the fast durable storage to generate modified data; and
storing, after modifying the one or more portions of data, the modified data within the bulk durable storage.

13. A computer program product disposed upon a non-transitory computer readable medium, the computer program product comprising computer program instructions that, when executed, cause a computer to carry out the steps of:
receiving, in a storage system at a unified storage element that integrates both fast durable storage and bulk durable storage, a data storage operation from a host computer;
storing, in accordance with a first data resiliency technique that corresponds to a RAID N+2 format, data corresponding to the data storage operation within the fast durable storage of the unified storage element;
determining, based on the received data storage operation, that a complete RAID stripe has been written to the fast durable storage of the unified storage element; and
responsive to the determination that the complete RAID stripe has been written to the fast durable storage, moving a portion of the stored data from the fast durable storage to the bulk durable storage of the unified storage element, the bulk durable storage storing the data in accordance with a second data resiliency technique that corresponds to a RAID M+2 format, wherein M is different from N.

14. The computer program product of claim 13, wherein the data storage operation is a write operation, wherein performing the write operation comprises storing data in fast durable storage using the first data resiliency technique, wherein the first data resiliency technique includes use of a RAID N+2 format, and wherein moving the portion of data comprises storing the data in bulk durable storage using the second data resiliency technique, wherein the second data resiliency technique is different from the first data resiliency technique and includes use of a RAID M+2 format.

15. The computer program product of claim 13, wherein the computer program instructions, when executed, further cause the computer to carry out the steps of:
determining a data storage optimization that is applicable to one or more portions of stored data within the fast durable storage, wherein the data storage optimization includes performing data deduplication;
modifying the one or more portions of stored data within the fast durable storage to generate modified data; and
storing, after modifying the one or more portions of data, the modified data within the fast durable storage.

16. The computer program product of claim 15, wherein the computer program instructions, when executed, further cause the computer to carry out the steps of:
storing, after modifying the one or more portions of data, the modified data within the bulk durable storage.

* * * * *